US009426525B2

(12) United States Patent
Soundararajan et al.

(10) Patent No.: US 9,426,525 B2
(45) Date of Patent: Aug. 23, 2016

(54) METHODS AND APPARATUS TO COUNT PEOPLE IN AN AUDIENCE

(71) Applicants: Padmanabhan Soundararajan, Tampa, FL (US); Venugopal Srinivasan, Tarpon Springs, FL (US); Alexander Topchy, New Port Richey, FL (US)

(72) Inventors: Padmanabhan Soundararajan, Tampa, FL (US); Venugopal Srinivasan, Tarpon Springs, FL (US); Alexander Topchy, New Port Richey, FL (US)

(73) Assignee: THE NIELSEN COMPANY (US), LLC., New York, NY (US)

( * ) Notice: Subject to any disclaimer, the term of this patent is extended or adjusted under 35 U.S.C. 154(b) by 47 days.

(21) Appl. No.: 14/144,624

(22) Filed: Dec. 31, 2013

(65) Prior Publication Data
US 2015/0189378 A1    Jul. 2, 2015

(51) Int. Cl.
*H04H 60/33* (2008.01)
*H04N 21/442* (2011.01)
*H04N 21/41* (2011.01)

(52) U.S. Cl.
CPC ..... *H04N 21/44218* (2013.01); *H04N 21/4126* (2013.01); *H04N 21/44222* (2013.01); *H04N 21/44231* (2013.01)

(58) Field of Classification Search
CPC ............ H04N 21/441; H04N 21/4415; H04N 21/44213; H04N 41/44218; H04N 41/44222; H04N 21/44231
USPC ...................................... 725/9, 10, 11, 12, 13
See application file for complete search history.

(56) References Cited

U.S. PATENT DOCUMENTS

| | | | |
|---|---|---|---|
| 3,056,135 | A | 9/1962 | Currey et al. |
| 4,107,734 | A | 8/1978 | Percy et al. |
| 4,600,829 | A | 7/1986 | Walton |
| 4,626,904 | A | 12/1986 | Lurie |
| 4,644,509 | A | 2/1987 | Kiewit et al. |
| 4,652,915 | A | 3/1987 | Heller, III |

(Continued)

FOREIGN PATENT DOCUMENTS

| | | |
|---|---|---|
| EP | 0231427 | 8/1987 |
| EP | 0275328 | 7/1988 |

(Continued)

OTHER PUBLICATIONS

International Searching Authority, "Search Report", issued in connection with PCT patent application No. PCT/US2014/066522, mailed on Mar. 24, 2015, 4 pages.

(Continued)

*Primary Examiner* — James R Sheleheda
(74) *Attorney, Agent, or Firm* — Hanley, Flight & Zimmerman, LLC

(57) ABSTRACT

Methods, apparatus, systems and articles of manufacture to count people in an audience are disclosed. An example method includes analyzing location information collected by a portable device indicative of a location of the portable device. The method also includes analyzing proximity information collected by the portable device indicative of when a person is near the portable device. The example method further includes generating presence information based on (1) the location information and (2) the proximity information, the presence information being indicative of whether the person is present in a media exposure environment associated with a media presentation device.

29 Claims, 11 Drawing Sheets

(56) References Cited

U.S. PATENT DOCUMENTS

| | | | |
|---|---|---|---|
| 4,695,879 A * | 9/1987 | Weinblatt | H04H 60/31 725/10 |
| 4,718,106 A | 1/1988 | Weinblatt | |
| 4,769,697 A | 9/1988 | Gilley et al. | |
| 4,779,198 A | 10/1988 | Lurie | |
| 4,858,000 A | 8/1989 | Lu | |
| 4,905,080 A | 2/1990 | Watanabe et al. | |
| 4,930,011 A | 5/1990 | Kiewit | |
| 4,955,000 A | 9/1990 | Nastrom | |
| 4,972,471 A | 11/1990 | Gross et al. | |
| 4,972,503 A | 11/1990 | Zurlinden | |
| 4,990,892 A | 2/1991 | Guest et al. | |
| 5,023,929 A | 6/1991 | Call | |
| 5,119,104 A | 6/1992 | Heller | |
| 5,146,231 A | 9/1992 | Ghaem et al. | |
| 5,226,090 A | 7/1993 | Kimura | |
| 5,226,177 A | 7/1993 | Nickerson | |
| 5,285,498 A | 2/1994 | Johnston | |
| 5,373,315 A | 12/1994 | Dufresne et al. | |
| 5,382,970 A | 1/1995 | Kiefl | |
| 5,382,983 A | 1/1995 | Kwoh et al. | |
| 5,387,993 A | 2/1995 | Heller et al. | |
| 5,394,461 A | 2/1995 | Garland | |
| 5,404,377 A | 4/1995 | Moses | |
| 5,436,653 A | 7/1995 | Ellis et al. | |
| 5,442,343 A | 8/1995 | Cato et al. | |
| 5,450,490 A | 9/1995 | Jensen et al. | |
| 5,457,807 A | 10/1995 | Weinblatt | |
| 5,473,631 A | 12/1995 | Moses | |
| 5,481,294 A | 1/1996 | Thomas et al. | |
| 5,483,276 A | 1/1996 | Brooks et al. | |
| 5,550,928 A | 8/1996 | Lu et al. | |
| 5,574,962 A | 11/1996 | Fardeau et al. | |
| 5,579,124 A | 11/1996 | Aijala et al. | |
| 5,581,800 A | 12/1996 | Fardeau et al. | |
| 5,594,934 A | 1/1997 | Lu et al. | |
| 5,621,793 A | 4/1997 | Bednarek et al. | |
| 5,629,739 A | 5/1997 | Dougherty | |
| 5,630,203 A | 5/1997 | Weinblatt | |
| 5,640,144 A | 6/1997 | Russo et al. | |
| 5,646,675 A | 7/1997 | Copriviza et al. | |
| 5,692,215 A | 11/1997 | Kutzik et al. | |
| 5,764,763 A | 6/1998 | Jensen et al. | |
| 5,774,876 A | 6/1998 | Woolley et al. | |
| 5,787,334 A | 7/1998 | Fardeau et al. | |
| 5,793,409 A | 8/1998 | Tetsumura | |
| 5,815,114 A | 9/1998 | Speasl et al. | |
| 5,872,588 A | 2/1999 | Aras et al. | |
| 5,893,093 A | 4/1999 | Wills | |
| 5,896,164 A | 4/1999 | Orbach et al. | |
| 5,896,554 A | 4/1999 | Itoh et al. | |
| 5,917,425 A | 6/1999 | Crimmins et al. | |
| 5,982,808 A | 11/1999 | Otto | |
| 6,002,918 A | 12/1999 | Heiman et al. | |
| 6,035,177 A | 3/2000 | Moses et al. | |
| 6,091,956 A | 7/2000 | Hollenberg | |
| 6,097,441 A | 8/2000 | Allport | |
| 6,098,048 A | 8/2000 | Dashefsky et al. | |
| 6,157,413 A | 12/2000 | Hanafee et al. | |
| 6,252,522 B1 | 6/2001 | Hampton et al. | |
| 6,327,619 B1 | 12/2001 | Blumenau | |
| 6,353,929 B1 | 3/2002 | Houston | |
| 6,359,557 B2 | 3/2002 | Bilder | |
| 6,396,413 B2 | 5/2002 | Hines et al. | |
| 6,424,264 B1 | 7/2002 | Giraldin et al. | |
| 6,430,498 B1 | 8/2002 | Maruyama et al. | |
| 6,433,689 B1 | 8/2002 | Hovind et al. | |
| 6,434,614 B1 | 8/2002 | Blumenau | |
| 6,467,089 B1 | 10/2002 | Aust et al. | |
| 6,470,264 B2 | 10/2002 | Bide | |
| 6,493,649 B1 | 12/2002 | Jones et al. | |
| 6,539,393 B1 | 3/2003 | Kabala | |
| 6,563,423 B2 | 5/2003 | Smith | |
| 6,577,238 B1 | 6/2003 | Whitesmith et al. | |
| 6,647,548 B1 | 11/2003 | Lu et al. | |
| 6,654,800 B1 | 11/2003 | Rieger, III | |
| 6,731,942 B1 | 5/2004 | Nageli | |
| 6,745,011 B1 | 6/2004 | Hendrickson et al. | |
| 6,748,317 B2 | 6/2004 | Maruyama et al. | |
| 6,754,470 B2 | 6/2004 | Hendrickson et al. | |
| 6,766,524 B1 | 7/2004 | Matheny et al. | |
| 6,842,877 B2 | 1/2005 | Robarts et al. | |
| 6,845,360 B2 | 1/2005 | Jensen et al. | |
| 6,871,180 B1 | 3/2005 | Neuhauser et al. | |
| 6,882,837 B2 | 4/2005 | Fernandez et al. | |
| 6,888,457 B2 | 5/2005 | Wilkinson et al. | |
| 6,898,434 B2 | 5/2005 | Pradhan et al. | |
| 6,919,803 B2 | 7/2005 | Breed | |
| 6,934,508 B2 | 8/2005 | Ceresoli et al. | |
| 6,940,403 B2 | 9/2005 | Kail, IV | |
| 6,958,710 B2 | 10/2005 | Zhang et al. | |
| 6,967,674 B1 | 11/2005 | Lausch | |
| 6,970,131 B2 | 11/2005 | Percy et al. | |
| 6,970,698 B2 | 11/2005 | Majmundar et al. | |
| 7,038,619 B2 | 5/2006 | Percy et al. | |
| 7,046,162 B2 | 5/2006 | Dunstan | |
| 7,076,441 B2 | 7/2006 | Hind et al. | |
| 7,080,061 B2 | 7/2006 | Kabala | |
| 7,099,676 B2 | 8/2006 | Law et al. | |
| 7,100,181 B2 | 8/2006 | Srinivasan et al. | |
| 7,126,454 B2 | 10/2006 | Bulmer | |
| 7,143,010 B2 | 11/2006 | Sprogis et al. | |
| 7,148,803 B2 | 12/2006 | Bandy et al. | |
| 7,155,159 B1 | 12/2006 | Weinblatt et al. | |
| 7,171,331 B2 | 1/2007 | Vock et al. | |
| 7,181,756 B1 | 2/2007 | Zigmond et al. | |
| 7,222,071 B2 | 5/2007 | Neuhauser et al. | |
| 7,284,255 B1 | 10/2007 | Apel et al. | |
| 7,295,108 B2 | 11/2007 | Corrado et al. | |
| 7,343,615 B2 | 3/2008 | Nelson et al. | |
| 7,379,778 B2 | 5/2008 | Hayes et al. | |
| 7,460,827 B2 | 12/2008 | Schuster et al. | |
| 7,463,143 B2 | 12/2008 | Forr et al. | |
| 7,471,987 B2 | 12/2008 | Crystal et al. | |
| 7,483,975 B2 | 1/2009 | Kolessar et al. | |
| 7,586,439 B2 | 9/2009 | Percy et al. | |
| 7,587,728 B2 | 9/2009 | Wheeler et al. | |
| 7,587,732 B2 | 9/2009 | Wright et al. | |
| 7,640,141 B2 | 12/2009 | Kolessar et al. | |
| 7,680,889 B2 | 3/2010 | Blumenau et al. | |
| 7,739,705 B2 | 6/2010 | Lee et al. | |
| 7,770,193 B2 | 8/2010 | Lee | |
| 7,894,703 B2 | 2/2011 | Lapstun et al. | |
| 7,908,133 B2 | 3/2011 | Neuhauser | |
| 7,917,130 B1 | 3/2011 | Christensen et al. | |
| 8,023,882 B2 | 9/2011 | Croy et al. | |
| 8,091,100 B2 | 1/2012 | Donato | |
| 8,180,376 B1 | 5/2012 | Merritt | |
| 8,185,351 B2 | 5/2012 | Crystal et al. | |
| 8,225,342 B2 | 7/2012 | Mears et al. | |
| 8,280,408 B2 | 10/2012 | Ruckart et al. | |
| 8,516,533 B2 | 8/2013 | Davis et al. | |
| 8,522,271 B2 | 8/2013 | Childress et al. | |
| 8,538,333 B2 | 9/2013 | Jain et al. | |
| 8,555,304 B2 | 10/2013 | Mears et al. | |
| 8,738,763 B2 | 5/2014 | Crystal et al. | |
| 8,799,951 B1 * | 8/2014 | Hamilton | H04N 21/2668 725/12 |
| 8,825,763 B2 * | 9/2014 | Schoen | G06Q 50/01 709/200 |
| 8,977,194 B2 | 3/2015 | Jain et al. | |
| 9,055,336 B2 * | 6/2015 | Ramaswamy | H04L 12/66 |
| 2002/0010919 A1 | 1/2002 | Lu et al. | |
| 2002/0056089 A1 | 5/2002 | Houston | |
| 2002/0059218 A1 | 5/2002 | August et al. | |
| 2002/0059577 A1 | 5/2002 | Lu et al. | |
| 2002/0068556 A1 | 6/2002 | Brown | |
| 2002/0083060 A1 | 6/2002 | Wang et al. | |
| 2002/0097885 A1 | 7/2002 | Birchfield et al. | |
| 2002/0112048 A1 | 8/2002 | Gruyer et al. | |
| 2002/0129360 A1 | 9/2002 | Lee | |
| 2002/0133393 A1 | 9/2002 | Tatsumi et al. | |
| 2002/0144259 A1 | 10/2002 | Gutta et al. | |
| 2002/0174425 A1 | 11/2002 | Markel et al. | |

(56) References Cited

U.S. PATENT DOCUMENTS

| | | |
|---|---|---|
| 2002/0178220 A1 | 11/2002 | Smith et al. |
| 2002/0198762 A1 | 12/2002 | Donato |
| 2003/0005430 A1 | 1/2003 | Kolessar |
| 2003/0033600 A1 | 2/2003 | Cliff et al. |
| 2003/0045301 A1 | 3/2003 | Wollrab |
| 2003/0093784 A1 | 5/2003 | Dimitrova et al. |
| 2003/0097302 A1 | 5/2003 | Overhultz et al. |
| 2003/0122708 A1 | 7/2003 | Percy et al. |
| 2003/0126593 A1 | 7/2003 | Mault |
| 2003/0136827 A1 | 7/2003 | Kaneko et al. |
| 2003/0146871 A1 | 8/2003 | Karr et al. |
| 2003/0170001 A1 | 9/2003 | Breen |
| 2003/0171833 A1 | 9/2003 | Crystal et al. |
| 2003/0177488 A1 | 9/2003 | Smith et al. |
| 2003/0194004 A1 | 10/2003 | Srinivasan |
| 2003/0208754 A1 | 11/2003 | Sridhar et al. |
| 2003/0222819 A1 | 12/2003 | Karr et al. |
| 2003/0222820 A1 | 12/2003 | Karr et al. |
| 2004/0019463 A1 | 1/2004 | Kolessar et al. |
| 2004/0019675 A1 | 1/2004 | Hebeler, Jr. et al. |
| 2004/0027271 A1 | 2/2004 | Schuster et al. |
| 2004/0058675 A1 | 3/2004 | Lu et al. |
| 2004/0111738 A1 | 6/2004 | Gunzinger |
| 2004/0122679 A1 | 6/2004 | Neuhauser et al. |
| 2004/0198386 A1 | 10/2004 | Dupray |
| 2004/0266457 A1 | 12/2004 | Dupray |
| 2005/0006466 A1 | 1/2005 | Overhultz et al. |
| 2005/0035857 A1 | 2/2005 | Zhang et al. |
| 2005/0125820 A1* | 6/2005 | Nelson ................. H04H 60/32 725/18 |
| 2005/0141345 A1 | 6/2005 | Holm et al. |
| 2005/0144632 A1* | 6/2005 | Mears ................. H04H 60/31 725/15 |
| 2005/0172311 A1 | 8/2005 | Hjelt et al. |
| 2005/0200476 A1 | 9/2005 | Forr et al. |
| 2005/0201826 A1 | 9/2005 | Zhang et al. |
| 2005/0203798 A1 | 9/2005 | Jensen et al. |
| 2005/0204379 A1 | 9/2005 | Yamamori |
| 2005/0207592 A1 | 9/2005 | Sporer et al. |
| 2005/0216509 A1 | 9/2005 | Kolessar et al. |
| 2005/0234774 A1 | 10/2005 | Dupree |
| 2005/0243784 A1 | 11/2005 | Fitzgerald et al. |
| 2005/0264430 A1 | 12/2005 | Zhang et al. |
| 2006/0053110 A1 | 3/2006 | McDonald et al. |
| 2006/0075421 A1 | 4/2006 | Roberts et al. |
| 2006/0168613 A1 | 7/2006 | Wood et al. |
| 2006/0294225 A1 | 12/2006 | Grecco et al. |
| 2007/0006250 A1 | 1/2007 | Croy et al. |
| 2007/0011040 A1* | 1/2007 | Wright et al. .................. 705/10 |
| 2007/0055987 A1 | 3/2007 | Lu et al. |
| 2007/0130580 A1 | 6/2007 | Covell et al. |
| 2007/0232232 A1 | 10/2007 | Matsuo et al. |
| 2007/0266395 A1 | 11/2007 | Lee et al. |
| 2007/0288277 A1 | 12/2007 | Neuhauser et al. |
| 2007/0288476 A1 | 12/2007 | Flanagan, III et al. |
| 2007/0294057 A1 | 12/2007 | Crystal et al. |
| 2007/0294132 A1 | 12/2007 | Zhang et al. |
| 2007/0294705 A1 | 12/2007 | Gopalakrishnan et al. |
| 2007/0294706 A1 | 12/2007 | Neuhauser et al. |
| 2008/0022294 A1 | 1/2008 | Perrin et al. |
| 2008/0059988 A1* | 3/2008 | Lee .................. G06Q 30/02 725/9 |
| 2008/0091489 A1 | 4/2008 | LaRock et al. |
| 2008/0101454 A1 | 5/2008 | Luff et al. |
| 2008/0109295 A1 | 5/2008 | McConochie et al. |
| 2008/0204273 A1 | 8/2008 | Crystal et al. |
| 2008/0243590 A1 | 10/2008 | Rich |
| 2008/0263579 A1* | 10/2008 | Mears ................. G11B 27/322 725/9 |
| 2009/0037575 A1* | 2/2009 | Crystal ............... G06Q 30/02 709/224 |
| 2009/0070797 A1* | 3/2009 | Ramaswamy ......... H04L 12/66 725/10 |
| 2009/0169024 A1 | 7/2009 | Krug et al. |
| 2009/0171767 A1 | 7/2009 | Kolessar |
| 2009/0193052 A1 | 7/2009 | Fitzgerald et al. |
| 2009/0265729 A1* | 10/2009 | Weinblatt ............... H04H 60/45 725/19 |
| 2009/0300669 A1 | 12/2009 | Wright et al. |
| 2010/0130212 A1 | 5/2010 | So et al. |
| 2010/0161506 A1 | 6/2010 | Bosenick et al. |
| 2010/0199296 A1 | 8/2010 | Lee et al. |
| 2010/0257052 A1 | 10/2010 | Zito et al. |
| 2010/0269127 A1 | 10/2010 | Krug |
| 2011/0019835 A1 | 1/2011 | Schmidt et al. |
| 2011/0040628 A1 | 2/2011 | Kido |
| 2011/0091055 A1 | 4/2011 | LeBlanc |
| 2011/0106587 A1 | 5/2011 | Lynch et al. |
| 2011/0173074 A1 | 7/2011 | Shinozaki |
| 2011/0207440 A1 | 8/2011 | Ruuspakka et al. |
| 2011/0295926 A1 | 12/2011 | Battiston et al. |
| 2011/0306324 A1 | 12/2011 | Jang et al. |
| 2011/0312338 A1 | 12/2011 | Park et al. |
| 2011/0313856 A1 | 12/2011 | Cohen et al. |
| 2012/0051295 A1 | 3/2012 | Ergen |
| 2012/0072940 A1* | 3/2012 | Fuhrer ................. H04H 60/31 725/13 |
| 2012/0114194 A1 | 5/2012 | Kim et al. |
| 2012/0135684 A1 | 5/2012 | Shrum, Jr. et al. |
| 2012/0148058 A1 | 6/2012 | Chen |
| 2012/0213410 A1 | 8/2012 | Ramaswamy et al. |
| 2012/0218436 A1 | 8/2012 | Rhoads et al. |
| 2012/0219156 A1 | 8/2012 | Ramaswamy et al. |
| 2012/0253925 A1 | 10/2012 | Chen et al. |
| 2012/0290360 A1 | 11/2012 | Zhang et al. |
| 2013/0041758 A1 | 2/2013 | Mikan et al. |
| 2013/0041759 A1 | 2/2013 | Mikan et al. |
| 2013/0052954 A1 | 2/2013 | Avadhanam |
| 2013/0137451 A1 | 5/2013 | Meredith et al. |
| 2013/0151610 A1* | 6/2013 | Schoen ................. G06Q 50/01 709/204 |
| 2013/0157568 A1 | 6/2013 | Jain et al. |
| 2013/0160042 A1 | 6/2013 | Stokes et al. |
| 2013/0202128 A1 | 8/2013 | Jain et al. |
| 2013/0219417 A1* | 8/2013 | Gilson ................. H04N 21/258 725/12 |
| 2013/0222277 A1 | 8/2013 | O'Hara |
| 2013/0297422 A1 | 11/2013 | Hunter et al. |
| 2014/0104435 A1* | 4/2014 | Luff ................. H04N 7/17309 348/180 |
| 2014/0105462 A1* | 4/2014 | Ramaswamy ......... H04H 60/33 382/103 |
| 2014/0115615 A1* | 4/2014 | Fuhrer ................. H04H 60/31 725/11 |
| 2014/0229232 A1 | 8/2014 | Crystal et al. |
| 2014/0250448 A1 | 9/2014 | Nielsen |
| 2014/0259033 A1* | 9/2014 | Ramaswamy ......... H04L 12/66 725/12 |
| 2014/0282640 A1 | 9/2014 | Nielsen |
| 2014/0282641 A1 | 9/2014 | Fry et al. |
| 2014/0282663 A1 | 9/2014 | Lee |
| 2014/0295764 A1 | 10/2014 | Jain et al. |
| 2014/0344844 A1* | 11/2014 | Wright ................. G06Q 30/02 725/18 |
| 2015/0100692 A1 | 4/2015 | Jain et al. |
| 2015/0189378 A1* | 7/2015 | Soundararajan . H04N 21/44218 725/12 |
| 2015/0264430 A1* | 9/2015 | Fuhrer ................. H04H 60/31 725/11 |
| 2015/0271549 A1* | 9/2015 | Ramaswamy ......... H04L 12/66 725/12 |

FOREIGN PATENT DOCUMENTS

| | | |
|---|---|---|
| EP | 0425347 | 5/1991 |
| EP | 0683451 | 11/1995 |
| EP | 0697773 | 2/1996 |
| EP | 0713335 | 5/1996 |
| EP | 1026847 | 9/2000 |
| EP | 1133090 | 9/2001 |
| EP | 1213860 | 6/2002 |
| EP | 2182752 | 5/2010 |
| GB | 2260246 | 7/1993 |
| GB | 2292506 | 2/1996 |

(56) References Cited

FOREIGN PATENT DOCUMENTS

| | | |
|---|---|---|
| JP | 2000307530 | 11/2000 |
| JP | 2001209881 | 8/2001 |
| JP | 2002051274 | 2/2002 |
| JP | 2005520393 | 7/2005 |
| JP | 2006260275 | 9/2006 |
| WO | 9111062 | 7/1991 |
| WO | 9411989 | 5/1994 |
| WO | 9504430 | 2/1995 |
| WO | 9731440 | 8/1997 |
| WO | 9810539 | 3/1998 |
| WO | 9933206 | 7/1999 |
| WO | 9955057 | 10/1999 |
| WO | 0131816 | 5/2001 |
| WO | 02/11123 | 2/2002 |
| WO | 0245273 | 6/2002 |
| WO | 03077455 | 9/2003 |
| WO | 03087871 | 10/2003 |
| WO | 03091990 | 11/2003 |
| WO | 03095945 | 11/2003 |
| WO | 2004051303 | 6/2004 |
| WO | 2004051304 | 6/2004 |
| WO | 2005038625 | 4/2005 |
| WO | 2005071961 | 8/2005 |
| WO | 2006026736 A2 | 3/2006 |
| WO | 2006037014 | 4/2006 |
| WO | 2006096177 | 9/2006 |
| WO | 2006121681 | 11/2006 |
| WO | 2008055865 | 5/2008 |
| WO | 2008149368 | 12/2008 |
| WO | 2009033187 | 3/2009 |
| WO | 2011080707 | 7/2011 |
| WO | 2013090917 | 6/2013 |

OTHER PUBLICATIONS

International Searching Authority, "Written Opinion", issued in connection with PCT patent application No. PCT/US2014/066522, mailed on Mar. 24, 2015, 10 pages.

Azondekon et al., "Service Selection in Networks Based on Proximity Confirmation Using Infrared", http://www.scs.carleton.ca/-barbeau/Publications/2002/azondekon.pdf, International Conference on Telecommunications (ICT) Beijing, 2002 (5 Pages).

Bahl et al., "A Software System for Locating Mobile Users: Design, Evaluation, and Lessons", Technical Report MSRTR-2000-12 Microsoft Research, [retrieved from internet, http://research.microsoft.com/-bahl/Papers/Pdf/radar.pdf], Feb. 2000 (13 Pages).

Battiti, Roberto, et al. "Location-Aware Computing: a Neutral Network Model for Determining Location in Wireless LANS" University of Trento: Department of Information and Communication Technology, Technical Report #DIT-02-0083, Feb. 2002 (pp. 1-16).

Bernstein et al., "An Introduction to Map Matching for Personal Navigation Assistants," New Jersey Tide Center, New Jersey Institute of Technology, Aug. 1996 (17 pages).

Cricket Project, "Cricket v2 User Manual," MIT Computer Science and Artificial Intelligence Lab, Cambridge, U.S.A., Jan. 2005 (57 pages).

Fang et al., "Design of a Wireless Assisted Pedestrian Dead Reckoning System—The NavMote Experience," vol. 54, Issue 6, Institute of Electrical and Electronics Engineers (IEEE), Dec. 2005 (16 pages).

Ferguson, Michael, "XTension Tech Notes," [online] Sand Hill Engineering Inc., Dec. 10, 1998 [retrieved in Jan. 12, 2004]. Retrieved from the Internet: <URL: http://www.shed.com/articles/TN.proximity.html >. (9 pages).

Gentile et al., "Robust Location using System Dynamics and Motion Constraints," National Institute of Standards and Technology, Wireless Communication Technologies Group, Jun. 24, 2004 (5 pages).

Handy et al., "Lessons Learned from Developing a Bluetooth Multiplayer-Game," 2nd International Conference on Pervasive Computing, Workshop on Gaming, [retrieved from internet, http://www.ipsi.fraunhofer.de/ambiente/pervasivegaming/papers/Handy Pervasive2004.pdf], Jan. 2004, (7 pages).

Holm, Sverre, "Technology Presentation," [online] Sonitor Technologies, May 26, 2004 [retrieved on Oct. 13, 2004]. Retrieved from the Internet: <URL: www.sonitor.com/news/article.asp?id=62> (16 pages).

Kanellos, Michael, "Dust Makes Mesh of Wireless Sensors," [online] CNET News.com, Sep. 20, 2004 [retrieved on Sep. 29, 2004]. Retrieved from the Internet: <URL: http://www.news.com/Dust-makes-mesh-of-wireless-sensors/2100-1008 3-5374971.html?tag=item>. (2 pages).

Kerschbaumer, Ken, "Who's Really Watching? How Cable's Digital Box Will Rock the Ratings World," Reed Business Information, a Division of Reed Elsevier, Inc., May 16, 2005 (4 pages).

McCarthy et al., "RF Free Ultrasonic Positioning (Presentation)," 7th International Symposiom on Wearable Computers, Oct. 2003 (12 pages).

McCarthy et al., "RF Free Ultrasonic Positioning," Department of Computer Science, University of Bristol, U.K., 2003 (7 pages).

Wagner, David P. Battelle, Report: Lexington Area Travel Data Collection Test; GPS for Personal Travel Surveys. Final Report for Office of Highway Information Management, Office of Technology Application, and Federal Highway Administration, Sep. 15, 1997, (92 pages).

Yeung, K.L. & Yum, T.-S.P., "A Comparative Study on Location Tracking Strategies in Cellular Mobile Radio Systems," Global Telecommunications Conference, Nov. 14-26, 1995 (pp. 22-28).

"NIST Location System," [online] Wireless Communication Technologies Group, National Institute of Standards and Technology, Mar. 12, 2004 [retrieved in Nov. 1, 2004]. Retrieved from the Internet:<URL:www.antd.nist.gov>. (2 pages).

"The Nibble Location System," [online] UCLA, May 21, 2001 [retrieved on Nov. 2, 2004]. Retrieved from the Internet: <URL: http://mmsl.cs.ucla.edu/nibble/>. (13 pages).

U.S. Appl. No. 61/695,169, filed Aug. 30, 2012, (31 pages).

Anderson, Nate, "Google to compete with Nielsen for TV-ratings info?" ArsTechnica.com, Jun. 19, 2006 [retrieved in Mar. 19, 2009]. Retrieved from Internet:<URL: http://arstechnica.com/uncategorized/2006/06/7081-2/> (2 pages).

Claburn, Thomas, "Google Researchers Propose TV Monitoring," InformationWeek.com, Jun. 7, 2006 [retrieved in Mar. 19, 2009]. Retrieved from Internet:<URL: http://www.informationweek.com/news/internet/showArticle.jhtml?articleID=188702619> (3 pages).

Fink et al., "Social- and Interactive-Television Applications Based on Real-Time Ambient-Audio Identification," European Interactive TV Conference (Euro-ITV), 2006, 10 pages.

\* cited by examiner

210 ↘

| AUDIENCE MEMBER PANELIST (302) | AUDIENCE MEMBER PRESENT (LOGGED IN) (312) |
|---|---|
| FIRST PANELIST (304) | 1 |
| SECOND PANELIST (306) | 1 |
| THIRD PANELIST (308) | 0 |
| GUEST (310) | 0 |
| TOTAL COUNT (314) | 2 |

FIG. 3

METHODS AND APPARATUS TO COUNT PEOPLE IN AN AUDIENCE

FIELD OF THE DISCLOSURE

This disclosure relates generally to audience measurement, and, more particularly, to methods and apparatus to count people in an audience.

BACKGROUND

To identify audience compositions, an audience measurement entity enlists a plurality of people to cooperate as panelists in an audience measurement panel. Media exposure and/or consumption habits of the panelists and/or demographic data associated with the panelists is collected and used to statistically project a size and demographic makeup of, for example, a television viewing audience as a whole. In some instances, automatic or passive measurement systems are supplemented with active measurement system(s) that require, for example, input from the panelists.

BRIEF DESCRIPTION OF THE DRAWINGS

FIG. 3 is an example presence data structure associated with the example base metering device of FIGS. 1 and/or 2.

DETAILED DESCRIPTION

Figure 1:
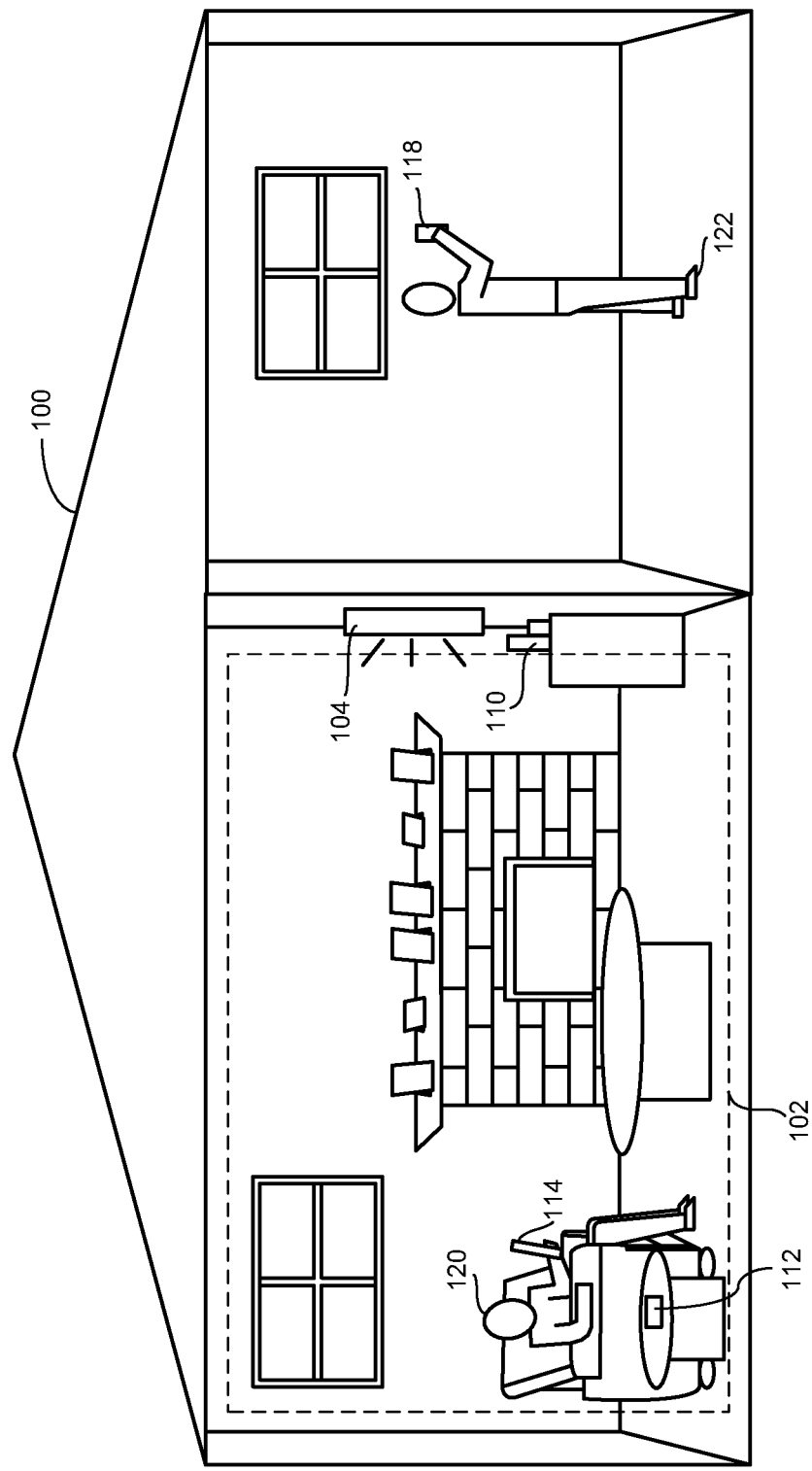
FIG. 1 is a diagram of an example system constructed in accordance with teachings of this disclosure to monitor media.

The process of enlisting and retaining participants for purposes of audience measurement can be a difficult and costly aspect of the audience measurement process. For example, participants must be carefully selected and screened for particular characteristics so that the population of participants is representative of the overall viewing population. In addition, the participants must be willing to perform specific tasks that enable the collection of the data and, ideally, the participants selected must be diligent about performing these specific tasks so that the audience measurement data accurately reflects their viewing habits.

For example, some audience measurement systems call for an amount of on-going input from the panelist (e.g., an audience member being exposed to media via a television). In some examples, the input is provided by the panelist physically engaging an input of a people meter. A people meter is an electronic device that is typically disposed in a media access area (e.g., a viewing area such as a living room of a panelist household) and that is proximate to and/or carried by one or more panelists. In some instances, the people meter is adapted (e.g., programmed) to communicate with a base metering device. The base metering device, which is sometimes referred to as a site unit, measures various signals associated with the monitored media presentation device (e.g., a television) for a variety of purposes including, for example, determining an operational status (e.g., on, off, standby, etc.) of the media presentation device) and identifying the media being presented by the media presentation device. Based on one or more triggers (e.g., a channel change or an elapsed period of time), the people meter generates a prompt to request presence and/or identity information from the audience. In some examples, the presence and/or identity information is supplied by depressing one of a set of buttons each of which is assigned to represent a different panelist (e.g., household member).

Periodically one or more persons (e.g., panelists and/or household member(s)) may forget or otherwise fail to log in via the people meter when they decide to, for example, consume media (e.g., watch television). Additionally, one or more persons may forget or otherwise fail to log out of the people meter when they finish a media session (e.g., quit watching television) and exit the media exposure environment while the media presentation device is still presenting media (e.g., to a person other than the person that left or to an empty room). Accordingly, the people meter prompts the corresponding panelists to register (e.g., log in) or to indicate that the panelists are still present (e.g., located in the media exposure area corresponding to the media presentation device). The presence information collected by the people meter is referred to herein as "people meter data."

Although periodically inputting information in response to a prompt may not be burdensome when required for an hour, a day or even a week or two, some participants find the prompting and data input tasks to be intrusive and annoying over longer periods of time. As a result, in some instances, panelists may choose to ignore prompts from the people meter and, thus, fail to provide accurate presence information. As such, there is a need to reduce a frequency at which the panelists are prompted while gathering accurate presence information, especially when the presence information is to be used in connection with detected media being played on a media presentation device.

Example methods, apparatus, and/or articles of manufacture disclosed herein reduce a number of inaccurate measurements generated that result from panelists failing to log in and/or log out when they begin and/or stop a media exposure session. In particular, examples disclosed herein use data collected via a portable secondary device (e.g., a smart phone, a tablet, a laptop computer, etc.) associated with (e.g., owned by and/or assigned to) a panelist to automatically detect the presence or absence of the panelist and/or another person (e.g., another household member and/or a visitor) within a media exposure environment including a primary media presentation device (e.g., a television located in a living room).

In some disclosed examples, the portable device includes software provided by a media measurement entity (e.g., the Nielsen Company, US (LLC)) to capture data via the portable device that can be analyzed to determine a location of the portable device relative to, for example, an exposure area of a primary media presentation device and to detect a person (e.g., the panelist associated with the portable device, another person (also a panelist), and/or a visitor in the home) in proximity to the portable device (e.g., within a threshold distance of the portable device). The data collected by the portable device to indicate the presence of people, including location information and proximity information (e.g., whether one or more persons is near the portable device) is referred to herein as "secondary presence data" to indicate the presence data is based on information collected via the portable (secondary) device as opposed to the device presenting the media (i.e., the primary media presentation device). The presence information derived from the portable device is referred to as "secondary" because presence information is also collected by a primary people metering device such as, for example, a base unit deployed as a stationary meter in the media exposure environment. The presence information collected by the primary people metering device is referred to herein as "primary presence data."

Using location information (e.g., a coordinate based on a global positioning system (GPS)) generated by the portable device in combination with proximity information generated by the portable device (e.g., whether one or more persons is near the portable device), the presence (or absence) of the person detected in proximity to a primary media presentation device may be determined. For example, if location information (e.g., a GPS coordinate) from the portable device is indicative of the portable device being located away from a media exposure environment in which a primary media presentation is located (e.g., a living room of a residence of the panelist) and the proximity information (e.g., captured audio data such as a person's voice that is identified as corresponding to the panelist via voice recognition) indicates the corresponding panelist is near the portable device, the panelist cannot be present in the media exposure environment of the primary media presentation device.

In some examples, location information collected via the portable device provides finer granularity to determine that the portable device, and by implication a person detected in proximity to the portable device, is located in, for example, the house of the panelist but in a different room. In such examples, the person would again be considered absent from the media exposure environment of the primary media presentation device. In some examples, the location information collected via the portable device indicates that the portable device is co-located with the primary media presentation device (e.g., in the media exposure environment of primary presentation device) such that when a person is detected as being in proximity to the portable device based on the proximity information collected by the portable device, the person can be identified as present in the media exposure environment. Thus, the person detected as present constitutes an audience member of media being presented via the primary media presentation device.

The particular distance between a person and the portable device for the person to be considered in proximity with the portable device depends upon, for example, the location of the portable device and the type of data being analyzed to determine proximity of the person to the portable device. In some examples, the proximity determination is based on usage data collected from the portable device. For example, certain usage characteristic(s) and/or value(s) imply that the person is holding the portable device and, thus, indicative of a high likelihood that the person is near the portable device. Additionally or alternatively, the proximity determination is based on audio data and/or image data captured via one or more sensors of the portable device (e.g., a microphone and/or a camera). In such examples, the person may be determined to be near the portable device but not actually carrying or holding the portable device.

Examples disclosed herein utilize the proximity determination in combination with location information indicative of a physical location of the portable device. For example, if the location of the portable device is determined to be outside the media exposure environment of the primary media presentation device (e.g., away from a room of house where the primary media presentation device is located), a person determined to be near the portable device is likewise not present in the media exposure environment of the primary media presentation device. Accordingly, references to a person being detected "in proximity" to a portable device as used herein correspond to that person being detected in the same location as the portable device. That is, if (1) the portable device is located outside of the media exposure environment of the primary media presentation device and (2) the proximity data indicates that the corresponding person is sufficiently close (e.g., within a threshold distance and determined with to a threshold likelihood or confidence) to the portable device, examples disclosed herein determine and/or confirm that the person is not located in the media exposure environment. By contrast, if (1) the portable device is located within the media exposure environment and (2) the proximity data indicates that the corresponding person is sufficiently close to the portable device, examples disclosed herein determine and/or confirm that the person is located in the media exposure environment. As disclosed further below, additional or alternative presence determinations are made by examples disclosed herein In some examples disclosed herein, the secondary presence data (e.g., presence determinations made by a secondary device based on the location information of the portable (secondary) device and corresponding proximity data) is compared to the primary presence information collected by the base metering device. For example, the based metering device prompts persons to log in via the people meter which has one or more buttons to engage to indicate presence or absence from the media exposure environment. In some instances, the secondary presence data indicates that a person is not present in the media exposure environment of the primary media presentation device even though the person is logged in as an audience member via the people meter. In such instances, examples disclosed herein update and/or adjust the people meter data by, for example, removing the incorrectly counted audience member from one or more counts and/or tallies associated with the media exposure environment and/or media detected in the environment. Additionally or alternatively, in some examples, the secondary presence data from the portable device indicates that a person who is not logged in via the people meter is, in fact, present in the media exposure environment of the primary presentation device. In such instances, examples disclosed herein update and/or adjust the people meter data by, for example, adding the incorrectly omitted audience member to one or more counts and/or tallies associated with the media exposure environment and/or media detected in the environment.

With the proliferation of portable electronic devices, it is becoming common for people to multitask or engage in activity on (or at least be carrying or otherwise in proximity to) a portable telephone or other device such as a tablet (e.g., an iPad™) while being exposed to media (e.g., while watching television). Accordingly, as usage of portable electronic devices continues to increase (e.g., while watching television), a greater reliance may be placed on the secondary presence data collected from such devices as disclosed herein to supplement and/or confirm people meter data. In such instances, examples disclosed herein generate more accurate data and provide an ability to less frequently prompt people for input.

In some examples disclosed herein, the base metering device performs the comparison(s) of the secondary presence data with the primary presence data (e.g., people meter data) and the corresponding adjustment of data based on discrepancies. In some examples disclosed herein, the portable device communicates the collected secondary presence data (e.g., location information and/or proximity information) to the base metering device. Additionally or alternatively, the base metering device may convey the people meter data to the portable device to enable the portable device to perform one or more comparisons and/or any appropriate changes to the people meter data. Additionally or alternatively, a central data collection facility collects the people meter data from the base metering device and the secondary presence data from the portable device such that the central facility performs one or more analyses and/or data updates and/or adjustments.

In some situations, such as when there is more than one member in a panelist household, detecting a person near a portable device may be insufficient to specifically identify which household member is near the portable device. Accordingly, in some disclosed examples, the proximity data collected by the portable device is further analyzed to identify or at least estimate the identity of the detected person. In some examples, estimating the identity of the person is based on a determination of a particular demographic characteristic of the person. For example, the proximity data may include a photo of a person captured via a camera of the portable device. Based on an analysis of the photo (e.g., via facial recognition), examples disclosed herein estimate that the person in the image data is an adult male. In such examples, the identity of the person detected near the portable device is associated with an adult male panelist and/or household member. In some examples, where a detected person cannot be identified as corresponding to any known panelist and/or household member, examples disclosed herein determine or assume that the person is a visitor. In such instances, examples disclosed herein estimate one or more demographic characteristics of the visitor based on, for example, the data collected by the portable device.

Additionally or alternatively, in some disclosed examples, data obtained via the portable device is analyzed to determine an activity or behavior of one or more persons. For example, based on movement data collected from motion sensors of the portable device, examples disclosed herein estimate an activity and/or an amount of activity of the person. Further, in some examples disclosed herein, information regarding the usage of the portable device (e.g., applications on the device) is collected by the portable device to be analyzed to determine a level of engagement of the person to media being presented on the primary media presentation device. The additional data collected via the portable device (e.g., engagement information and/or activity information) is referred to herein as "augmented audience data" because it provides additional information that can augment or enhance audience measurement data with additional (e.g., behavioral and/or engagement) information about the detected audience members and/or their viewing habits and behaviors. For purposes of this disclosure, all data obtained via the portable device, including the secondary presence data (based on location information and proximity information), the augmented audience data (based on engagement information and activity information), and/or any other data collected by the portable device, is herein referred to as "secondary data."

As can be seen from the foregoing, secondary data obtained via a portable device can significantly enhance audience measurement data obtained via the people meter and/or base metering device. For example, the secondary data is used to detect people present in the environment but not logged in via the people meter. Additionally or alternatively, the secondary data is used to detect when a person is incorrectly logged in as an audience member of the environment. Further, the secondary data provides additional or value-added information associated with detected visitors or guests by, for example, estimating demographic information associated with the visitors or guests. Further, the secondary data can augment audience measurement data by providing an indication of not only who is watching but how they are watching, such as, what they are doing on the portable device (e.g., usage information), how that affects their engagement, and/or how they are moving or behaving (e.g., activity information).

FIG. 1 illustrates an example house 100 having an example media exposure environment 102 including a primary media presentation device 104, a primary people meter 112, and a base metering device 110. In the example of FIG. 1, the primary media presentation device 104 is a television. However, any suitable type of media presentation device (e.g., a personal computer, a radio, etc.) may implement as the primary media presentation device 104 for the environment 102. In the illustrated example of FIG. 1, the media exposure environment 102 is occupied by a first person 120. A second person 122 is located outside the media exposure environment 102 (e.g., in a room of the house 100 in which media presented via the media presentation device 104 cannot be detected). In the example of FIG. 1, the first and second persons 120, 122 are referred to as household members and/or panelists (e.g., members of a "Nielsen family") that have been statistically selected to develop, for example, media ratings data for a geographic location, a market, and/or a population/demographic of interest. In the illustrated example, one or more of the household members 120, 122 have registered with a media measurement entity (e.g., by agreeing to be a panelist) and have provided their demographic information to the media measurement entity as part of a registration process to enable associating demographics with, for example, detected media exposure. In the example of FIG. 1, the media exposure environment 102 includes an area in which the media presentation device 104 (e.g., a television) is located and from which the media presentation device 104 may be viewed and/or heard. Whether any of the household members 120, 122 or other people (e.g., guests) are counted as audience members of the media presentation device 104 depends on their presence within the media exposure environment 102. For purposes of this disclosure, a person that is within the media exposure environment 102 (and, thus, an audience member of media being presented on the media presentation device 104) is referred to as "present." In contrast, a person that is not within the media exposure environment 102 (and, thus, not an audience member of the media presentation device 104) is referred to as "absent." For example, as illustrated in FIG. 1, the first person 120 within the media exposure environment 102 is present and, therefore, is an audience member of the media presented via the media presentation device 104. In contrast, the second person 122 located outside of the media exposure environment 102 is absent and, thus, not an audience member of the media presentation device 104.

In the illustrated example of FIG. 1, the media presentation device 104 is implemented by a television coupled to a set-top box (STB) that implements a digital video recorder (DVR) and/or a digital versatile disc (DVD) player. Alternatively, the DVR and/or DVD player may be separate from the STB. In some examples, the base metering device 110 of FIG. 1 is installed (e.g., downloaded to and executed on) and/or otherwise integrated with the STB. Moreover, the example base metering device 110 of FIG. 1 can be implemented in connection with additional and/or alternative types of media presentation devices such as, for example, a radio, a computer display, a video game console and/or any other communication device able to present electronic media to one or more individuals via any past, present or future device(s), medium(s), and/or protocol(s) (e.g., broadcast television, analog television, digital television, satellite broadcast, Internet, cable, etc.). Further, the example audience measurement system of FIG. 1 can be implemented in additional and/or alternative types of environments such as, for example, a room in a non-statistically selected household, a theater, a restaurant, a tavern, a store, an arena, etc.

The example base metering device 110 of FIG. 1 is configured as a primarily stationary device disposed on or near the media presentation device 104 and may be adapted to perform one or more metering methods. Depending on the types of metering that the base metering device 110 is adapted to perform, the base metering device 110 may be physically coupled to the media presentation device 104 or may instead be configured to capture signals emitted externally by the media presentation device 104 such that direct physical coupling to the media presentation device 104 is not required. Preferably, an instance of the base metering device 110 is provided for each media presentation device 104 disposed in the house 100, such that the base metering devices 110 may be adapted to capture data regarding all in-home media exposure. In some examples, the base metering device 110 is implemented as a low-cost electronic device that may be shipped to the house 100 (e.g., via regular mail) and easily installed by the panelist by, for example, plugging the base metering device 110 into a commercial power supply, (e.g., an electrical outlet. An example implementation of the base metering device 110 of FIG. 1 is described in greater detail below in connection with FIG. 2.

In the illustrated example, the primary people meter 112 is disposed in the media exposure environment 102, within comfortable reach of the corresponding person (e.g., the first person 120. Although the example primary people meter 112 of FIG. 1 is illustrated as separate from the example base metering device 110, the primary people meter 112 may be integrated with the example base metering device 110. The example primary people meter 112 of FIG. 1 has a set of inputs (e.g., buttons), each of which is assigned to represent a single, different panelist and/or household member. In some examples, the primary people meter 112 includes additional buttons to identify the presence of guests or visitors in the media exposure environment 102. In some examples, the primary people meter 112 periodically presents a prompt via, for example, a set of LEDs, a display screen, and/or an audible tone, to request an indication from people that the people are present in the media exposure environment 102 (e.g., by pressing an assigned button and/or depressing the button assigned to a person that is absent or no longer in the media exposure environment).

In some examples, the primary people meter 112 is implemented as a stand-alone device that is communicatively coupled to the base metering device 110 and dedicating to people metering. In some examples, the primary people meter 112 is an integral part of the base metering device 110. In some examples, the primary people meter 112 is implemented as an integral part of a remote control device to enable a user to interact with the media presentation device 104. In some examples, the primary people meter 112 is implemented using a PDA or a cellular telephone that is kept within comfortable arms reach of the viewers located in the media exposure environment 102.

As shown in the illustrated example of FIG. 1, the first person 120 is near (e.g., proximate to) a first portable device 114 and the second person 122 is near a second portable device 118. While the portable devices 114, 118 are shown as being held by the first and second persons 120, 122, respectively, a person may be considered in proximity to the portable device 114, 118 without holding, carrying, or otherwise directly interacting with the portable device 114, 118. For example, the first person 120 may put the first portable device 114 on a table. In such instances, the first portable device 114 may still be considered in proximity with first person 120 based on, for example, audio data captured by an audio sensor (e.g., a microphone) of the first portable device 114 and/or image data captured by an image sensor (e.g., a camera) of the first portable device 114.

The example portable devices 114, 118 are, for example, a cellular telephone, a personal digital assistant (PDA), a smart phone, a handheld computer, a tablet, an e-reader, a laptop computer, and/or any other suitable portable electronic device. Using a readily available and/or panelist owned portable device to implement the portable devices 114, 118 of FIG. 1 allows the persons 120, 122 to, for example, more easily and more conveniently comply with terms of an agreement entered into with a media measurement entity. Specifically, the person 120 may already have been carrying a smart phone on a regular basis before becoming a panelist such that carrying the portable device 114 does not place any additional duties or burdens on the first person 120. In some such examples, the monitoring data obtained via the first portable device 114 is collected via software (e.g., program(s) running in a background) executed on the first portable device 114. In some examples, the software is provided to the first portable device 114 by the media measurement entity via a download from a network, such as the Internet. In some examples, the software executing on the first portable device 114 collects the monitoring data over time and transmits the collected data to a central data collection facility of the media measurement entity based on any suitable schedule and/or as needed. In some examples, the base metering device 110 and/or the primary people meter 112 periodically communicates control signals to the first portable device 114 instructing the first portable device 114 to capture people data (e.g., audio or image data). In such examples, the software installed on the first portable device 114 responds to the control signals by capturing the requested people data and transmitting the captured data back to the primary people meter 112.

In the example of FIG. 1, the portable devices 114, 118 are used to determine the presence or absence of the corresponding persons 120, 122 and/or other person(s) (e.g., one or more visitors) in the media exposure environment 102. In particular, presence data is gathered via one or more sensors of the portable devices 114, 118 and/or one or more programs or applications executed on the portable devices 114, 118 as is described in greater detail below. For example, the presence of the first person 120 is determined based on location information gathered by the first portable device 114 in conjunction with proximity information gathered by the first portable device 114 indicative of whether the first person 120 is near the first portable device 114. In some examples, the location information associated with the first portable device 114 is to be ignored based on, for example, the proximity information indicating that the first person 120 is not near the first portable device 114. That is, the presence of the first portable device 114 in the media exposure environment 102 may be inconclusive evidence of the presence of the first person 120 in the media exposure environment 102 because the first portable device 114 may have been left by the first person 114 in the media exposure environment 102 when the first person left the environment 102. Accordingly, in some such examples, the data obtained from the location of the first portable device 114 is ignored as unreliable. However, in some examples, the location data of the first portable device 114 is still used to, for example, generate one or more inferences about the presence or absence of the first person 120 in the media exposure environment 102 (e.g., near the media presentation device 104). For example, if the location information of the first portable device 114 indicates that the first portable device 114 is in transit outside of the house 100 (e.g., moving on a road or at a store as may be determined, for example, by a GPS module and/or speed sensors), it is inferred that the first person 120 is carrying the first portable device 114, even when the first person is not directly detected as being in proximity to the first portable device 114. In some examples, the determination that the first portable device 114 is in transit outside of the house is treated as confirmation that the first person 120 is absent from the media exposure environment 102.

In some examples, the first portable device 114 detects more than one person in proximity to the first portable device 114. In such examples, the proximity information used to detect people in proximity to the first portable device 114 is analyzed to distinguish and/or identify each of the detected people and/or to identify the number of people detected. In some examples, the first and second portable devices 114, 118 are in the same vicinity such that each of the portable devices 114, 118 separately detects the same person or people as being in proximity to each portable device 114, 118. In some such examples, the secondary data collected by each portable device 114, 118 is compared and/or shared to assist in identifying detected person(s) and/or to avoid counting the same person more than once. Such scenarios are described in greater detail below.

In some examples, an identity of a person (e.g., the first person 120) detected as being in proximity to a portable device (e.g., the first portable 114) corresponds to, for example, the owner or assigned user of the portable device. For example, the first portable device 114 may identify the first person 120 as the person near the first portable device 114. In some instances, the identity of a person detected as being near the first portable device 114 is assumed to be the first person 120. In other examples, the identity of the person detected as near the first portable device 114 is not directly inferred or assumed. Accordingly, in some examples, the particular person and/or a characteristic of the person may be identified or estimated based on further analysis of the proximity data (e.g., audio and/or image data captured by the first portable device 114). Additionally or alternatively, in some examples, the person detected as near the first portable device 114 may not be identifiable because the person is not a registered panelist (e.g., member of a household corresponding to the house 100), but rather is, for example, a visitor to the house 100. In such examples, one or more demographic characteristics (e.g., age, gender, ethnicity, etc.) of the detected visitor can be estimated based on the data collected by the portable devices 114, 118.

Further, in some examples, data is collected via the portable devices 114, 118 to augment audience measurement data with additional information about detected persons. For example, the first portable device 114 gathers activity information based on, for example, data captured by one or more motion sensors of the first portable device 114 indicative of an activity and/or behavior of the first person 120 (or any other person using the first portable device 120). In some examples, the first portable device 114 gathers usage information related to applications being used on the first portable device 114 indicative of, for example, a level of engagement of the first person 120 (or any other person using the first portable device 114) with a media presentation playing on the first portable device 114. Additionally or alternatively, the usage information associated with the first portable device 114 is used to determine a level of engagement with the media presentation device of the environment 102 and/or with the portable device itself.

In some examples, the first portable device 114 of FIG. 1 communicates the secondary data (e.g., proximity information, location information, activity information, engagement information, timestamp(s), etc.) obtained by the first portable device 114 to the example base metering device 110 of FIG. 1. For example, the first portable device 114 of FIG. 1 periodically and/or aperiodically transmits a message having a payload of data to the base metering device 110. Additionally or alternatively, the example first portable device 114 of FIG. 1 transmits the data to the base metering device 110 in response to queries from the base metering device 110, which periodically and/or aperiodically polls the environment 102 for collected information from, for example, the portable devices 114, 118. In the illustrated example of FIG. 1, the example base metering device 110 of FIG. 1 compares the primary presence information received from the example primary people meter 112 of FIG. 1 with the secondary presence data obtained via the example portable devices 114, 118 to, for example, confirm the accuracy of the data obtained via the primary people meter 112. In some examples, if there is a discrepancy between the primary presence information gathered via the example primary people meter 112 and the secondary presence information gathered via the portable devices 114, 118, the example base metering device 110 of FIG. 1 adjusts the primary presence information by removing incorrectly counted individuals from a tracked audience of the media presentation device 104 and/or decreases a count or tally of people in an audience for the media exposure environment 102. Alternatively, the example base metering device 110 of FIG. 1 adjusts the primary presence information by adding individuals to the tracked audience of the media presentation device 104 and/or increases a count or tally of people in an audience for the media exposure environment 102.

In some examples, the base metering device 110 of FIG. 1 communicates the primary presence information generated via inputs from the example primary people meter 112 to, for example, the first portable device 114. In such examples, the first portable device 114 compares the secondary presence data gathered via the first portable device 114 with the primary presence information gathered by the primary people meter 112 to confirm or appropriately adjust the primary presence information. When the primary presence information has been confirmed or adjusted as needed, the data is sent to a central data collection facility in the illustrated example. The central facility uses the received data to, for example, aggregate information associated with multiple panelist households and/or data collection devices or meters. Additionally or alternatively, the example base metering device 110 of FIG. 1 and one or more of the portable devices 114, 118 separately communicate with the central data collection facility. In some such examples, the central data collection facility compares the primary presence information gathered by the example primary people meter 112 and the secondary presence data from the portable device(s) 114, 118 to, for example, adjust or confirm data indicative of the audience composition in the media exposure environment 102 at a time corresponding to, for example, a detection of particular media being presented in the environment 102.

In some examples, the portable device(s) 114, 118 are additionally or alternatively tasked with detecting media presentations in the media exposure environment 102. For example, the first portable device 114 of FIG. 1 includes one or more sensors (e.g., microphone(s) and/or image capturing devices) to collect and/or detect signatures, codes, watermarks, etc. indicative of media presented in the environment 102 (e.g., by the media presentation device 104). In some examples, the first portable device 114 provides raw data collected by the sensor(s) of the first portable device 114 to the example base metering device 110 for processing and identification of media. In some examples, the base metering device 110 of FIG. 1 does not collect media identifying information, but does collect people meter data indicative of a number and/or identity of persons in the environment 102.

In some examples, the first portable device 114 of FIG. 1 functions as a primary media presentation device to directly present media to which one or more persons are exposed. In some such examples, the first portable device 114 of FIG. 1 detects the media playing on the first portable device 114. In such examples, the presence data collected by the first portable device 114 is used to detect people near to tally or count people as audience members of the media playing on the first portable device 114. In some examples, the first portable device identifies and/or estimates the identities of the detected people and/or, if the detected people are not identifiable as panelists (e.g., non-panelist visitors), estimates the demographic characteristics of the detected people.

In some examples, the first portable device 114 functions as a second screen device playing media (e.g., content and/or advertisements) supplemental to media separately playing on, for example, the media presentation device 104. For example, while a media presentation is being played on the media presentation device 104, the first person 120 may be viewing and/or interacting with supplemental media on the first portable device 114. In some such examples, the first portable device 114 monitors the media presentation of the media presentation device 104 and the supplemental media being presented on the first portable device 114. In some examples, the detected supplemental media and/or detected interactions with the supplemental media is analyzed to determine a level of engagement of the first person 120 (e.g., with the primary media presentation device 104). In some examples, the supplemental media may be used to determine whether the first person 120 is properly characterized as an audience member of the media presentation playing on the primary media presentation device 104 (e.g., according to the primary people meter 112). For example, where the presence of the first person 120 in the media exposure environment 102 is uncertain based on inconclusive location information and/or proximity information, detected interaction with supplemental media on the first portable device 114 corresponding to the media presentation playing on the media presentation device 104 is indicative of the first person 120 being an audience member of the media presentation. In contrast, if media detected on the first portable device 114 is unrelated to the media presentation of the media presentation device 104, the first person 120 is tracked as present but not engaged with the media presentation of the media presentation device 104.

Figure 2:
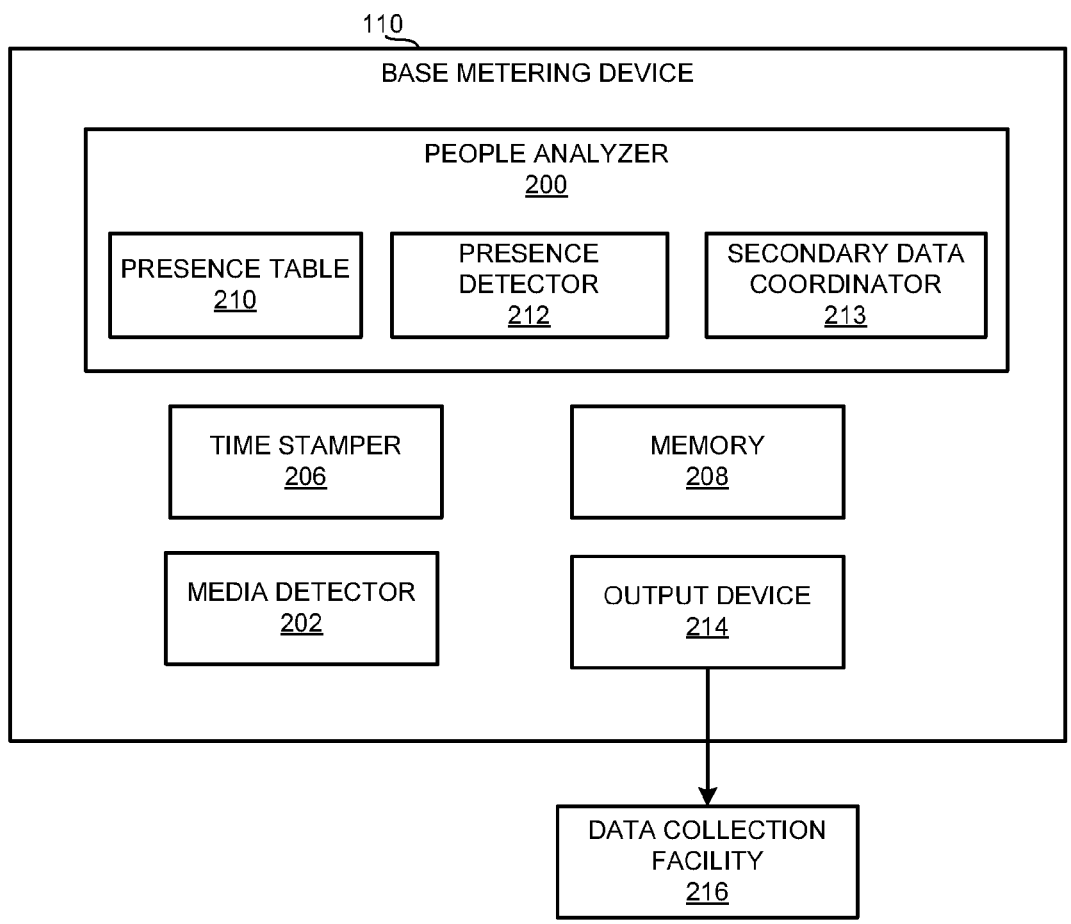
FIG. 2 is a block diagram of an example implementation of the example base metering device of FIG. 1.

FIG. 2 illustrates an example implementation of the base metering device 110 of FIG. 1. The example of FIG. 2 illustrates the base metering device 110 implemented independent of the primary people meter 112. However, in other examples, the base metering device 110 and the primary people meter 112 are integrated together. The example base metering device 110 of FIG. 2 includes a people analyzer 200 to develop audience composition information regarding, for example, presence of people in the media exposure environment 102 of FIG. 1. In the illustrated example of FIG. 2, the people analyzer 200 receives the primary presence information from the primary people meter 112 through which persons (e.g., the first and/or second persons 120, 122) indicate presence in the environment 102 by, for example, pushing a corresponding button on the primary people meter 112. In some examples, the primary people meter 112 only captures data and/or prompts for input when the primary media presentation device 104 is in an "on" state and/or when media is detected as being presented in the environment 102.

In the illustrated example of FIG. 2, the people analyzer 200 includes a presence detector 212 to identify people in the environment 102 and/or to generate a people count. In the illustrated example, the people analyzer 200 includes a presence table 210 to track the information generated by the example presence detector 212. In the illustrated example, the example people analyzer 200 of FIG. 2 generates people counts or tallies corresponding to periods of time and/or in response to a detected change in the primary presence data collected via the primary people meter 112. In the illustrated example of FIG. 2, the example presence detector 212 receives the secondary presence data gathered via the portable devices 114, 118. As described above, the secondary presence data is indicative of the location of the portable devices 114, 118 and person(s) being near the portable devices 114, 118. The example presence detector 212 of FIG. 2 analyzes and/or processes the secondary presence data to, for example, determine presence of people (e.g., the first person 120) in the media exposure environment 102 of FIG. 1. In the illustrated example of FIG. 2, the presence detector 212 compares the primary presence data from the primary people meter 112 to the secondary presence data from the portable device 114, 118 to confirm the presence of, the first person 120 as logged in via the primary people meter 112 and/or to identify discrepancies between the primary presence data and the secondary presence data. Where there are discrepancies, the example presence detector 212 of FIG. 2 adjusts or updates the primary presence information collected by the people meter 112 (e.g., as stored in the presence table 210). In some examples, the comparison between the primary presence information and the secondary presence information depends upon specifically identifying the person detected (e.g., when there are multiple household members). As such, in some examples, the presence detector 212 of FIG. 2 analyzes the proximity information of the secondary presence data to specifically identify or estimate the identity of a person that is detected as being near the portable device 114, 118. Where the detected person cannot be positively identified (e.g., the person is a visitor in the house 100 or the data is not sufficient to identify the person with a threshold amount of confidence), the example presence detector 212 of FIG. 2 determines or at least estimates an identifying characteristic, such as a demographic characteristic (e.g., age, gender, etc.), of the detected person.

Further, in some examples, the example presence detector 212 of FIG. 2 receives augmented audience data gathered via the portable devices 114, 118 including activity information (e.g., based on motions sensors of the portable devices 114, 118) and/or engagement information (e.g., based on usage of applications being used on the portable devices 114, 118). In some examples, the example presence detector 212 of FIG. 2 analyzes the activity information to determine the activity and/or behavior of the detected person during, for example, a media presentation playing on the primary media presentation device 104. Additionally or alternatively, in some examples, the presence detector 212 of FIG. 2 analyzes the engagement information to determine a level of engagement of a detected person with, for example, a media presentation playing on the media presentation device 104. An example implementation of the presence detector 212 is shown and described in greater detail below in connection with FIG. 5.

In some examples, the people analyzer 200 includes a secondary data coordinator 213 to coordinate the collection of data from the portable devices 114, 118. In some examples, the secondary data coordinator 213 periodically or aperiodically transmits a control signal to the portable device 114 and/or other portable devices that are present within the exposure environment 102 and/or within a communication range of the base metering device 110. In some such examples, the portable device 114 is programmed to capture secondary data including secondary presence data in response to the control signal and transmit the collected data back to the base metering device 110. In some examples, the portable device 114 only captures secondary data (e.g., audio data, image data, application usage data, etc.) when requested via the secondary data coordinator 213. In other examples, the portable device 114 collects secondary data and stores the data automatically but only transmits the data to the base metering device 110 when requested by the base metering device 110. In this manner, the secondary data coordinator 213 of the base metering device 110 can control or coordinate when data is captured and/or collected by the portable device 114.

For example, the secondary data coordinator 213 of the base metering device 110 may detect the presence of the first person 120 within the media exposure environment 102 based on the person manually logging in via the primary people meter 112. After a threshold period of time (e.g., 15 minutes), the base metering device 110 and/or the people meter 112 may prompt the person 120 to confirm they are still present within the environment 120. However, in some examples, rather than prompting the person 120 via the base metering device 110 and/or the people meter 112, the secondary data coordinator 213 may send out a control signal to wake up the portable device 114 with a request for the portable device 114 to capture secondary data at that time. In some examples, the portable device 114 responds to the request by collecting secondary data and transmitting the information back to the base metering device 110 for analysis by the presence detector 212. In some examples, if the secondary presence data confirms that the first person 120 is still present within the media exposure environment 102, the base metering device 110 will forego prompting the person 120 to re-register via the people meter 112. In this manner, the frequency of prompts and the associated annoyance to panelists may be reduced. If the collected secondary presence data indicates that the person 120 has left the environment 102 (or is at least not detected by the portable device 114), the base metering device 110 will prompt the first person to re-register via the people meter 112 to confirm whether the person 120 is still present or has in fact left. In some examples, if the secondary data provides a sufficient level of confidence to confirm the absence of the person 120, the base metering device 110 will automatically update the presence table 210 without prompting for any additional input via the people meter 112.

Additionally or alternative, in some examples, the secondary data coordinator 213 will send a control signal to the portable device when a change in audience membership is indicated via the people meter 112. For example, if the second person 122 enters the media environment 102 and logs into the primary people meter 112, the secondary data coordinator 213 of the base metering device 110 may transmit a request to wake up and/or collect secondary data from the portable devices 114, 118. In this manner, the base metering device may verify or determine whether other people (e.g., other household members, visitors, etc.) have entered the environment 102 with the second person 122. Furthermore, in such examples, the base metering device can confirm the location of the portable devices 114, 118 within the media exposure environment 102 and, thus, identify the portable devices 114, 118 as available sources of information regarding the presence of people within the media exposure environment 102. Further still, in addition to or instead of transmitting control signals when the people meter 112 receives new data or when a new prompt via the people meter 112 is due, the secondary data coordinator 213 may transmit control signals at any other appropriate time to control and/or coordinate when data is captured by the portable devices 114, 118 and analyzed to verify and/or adjust the primary presence data obtained via the primary people meter 112.

Although the people analyzer 200 is described above as being implemented via the base metering device 110, in some examples, the people analyzer 200 or components thereof is implemented via the people meter 112. In some examples, the people meter 112 may include the secondary data coordinator 213 to control when the portable device 114 is instructed to capture secondary data. In some such examples, the secondary data collected via the portable device 114 is transmitted to the primary people meter 112 and subsequently provided to the base metering device 110 along with the primary presence information collected via manual inputs directly into the people meter 112. In some examples, the people meter 112 generates the presence table 210 and/or analyzes the secondary data and compares the data against the presence table 210 before transmitting the same to the base metering device 110.

Data generated by the example presence detector 212 of FIG. 2 is tracked in the example presence table 210. The table 210 and/or its data is stored in memory 208 of the example base metering device 110 of FIG. 2. The example memory 208 of FIG. 2 may include a volatile memory (e.g., Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). The example memory 208 of FIG. 2 may include one or more double data rate (DDR) memories, such as DDR, DDR2, DDR3, mobile DDR (mDDR), etc. The example memory 208 of FIG. 2 may also include one or more mass storage devices such as, for example, hard drive disk(s), compact disk drive(s), digital versatile disk drive(s), etc.

The example time stamper 206 of FIG. 2 receives data from the example presence detector 212 and an example media detector 202 of the example base metering device 110 of FIG. 2. The example media detector 202 of FIG. 2 detects presentation(s) of media in the media exposure environment 102 and/or collects identification information associated with the detected presentation(s). For example, the media detector 202, which may be in wired and/or wireless communication with the media presentation device 104, an STB associated with the media presentation device 104, and/or any other component of FIG. 1, can identify a presentation time and/or a source (e.g., the STB, a video game console, a DVR, etc.) of a media presentation. The presentation time and the source identification data may be utilized to facilitate identification of the media by, for example, cross-referencing a program guide configured, for example, as a look up table. In such instances, the source identification data is, for example, the identity of a channel (e.g., obtained by monitoring a tuner of an STB or a digital selection made via a remote control signal) currently being presented on the media presentation device 104.

Additionally or alternatively, the example media detector 202 of FIG. 2 can identify the media being presented by detecting codes (e.g., watermarks) embedded with or otherwise conveyed (e.g., broadcast) with media being presented via the STB and/or the media presentation device 104. As used herein, a code is an identifier that is transmitted with the media for the purpose of identifying and/or for tuning to (e.g., a packet identifier header and/or other data used to tune or select packets in a multiplexed stream of packets) the corresponding media. Codes may be carried in the audio, in the video, in metadata, in a vertical blanking interval, in a program guide, in content data, or in any other portion of the media and/or the signal carrying the media. In the illustrated example, the media detector 202 extracts the code(s) from the media. In other examples, the media detector 202 may collect samples of the media and export the samples to a remote site for detection of the code(s).

Additionally or alternatively, the example media detector 202 of FIG. 2 can collect a signature representative of a portion of the media. As used herein, a signature is a representation of a characteristic of the signal carrying or representing one or more aspects of the media (e.g., a frequency spectrum of an audio signal). Signatures may be thought of as fingerprints of the media. Collected signature(s) can be compared against a collection of reference signatures of known media (e.g., content and/or advertisements) to identify media. In some examples, the signature(s) are generated by the media detector 202. Additionally or alternatively, the example media detector 202 collects samples of the media and exports the samples to a remote site for generation of the signature(s). In the example of FIG. 2, irrespective of the manner in which the media of the presentation is identified (e.g., based on tuning data, metadata, codes, watermarks, and/or signatures), the media identification information is time stamped by the time stamper 206 and stored in the memory 208.

In the illustrated example of FIG. 2, an output device 214 periodically and/or aperiodically exports data (e.g., the data in the presence table 210, media identifying information from the media detector 202) from the memory 208 to a data collection facility 216 via a network (e.g., a local-area network, a wide-area network, a metropolitan-area network, the Internet, a digital subscriber line (DSL) network, a cable network, a power line network, a wireless communication network, a wireless mobile phone network, a Wi-Fi network, etc.). In the illustrated example of FIG. 2, the data collection facility 216 is managed and/or owned by an audience measurement entity (e.g., The Nielsen Company (US), LLC). The audience measurement entity associated with the example data collection facility 216 of FIG. 2 utilizes the people tallies generated by the people analyzer 200 in conjunction with the media identifying data collected by the media detector 202 to generate exposure information. The information from many panelist locations may be collected and analyzed to generate ratings representative of media exposure by one or more populations of interest using any statistical methodology.

While an example manner of implementing the base metering device 110 of FIG. 1 is illustrated in FIG. 2, one or more of the elements, processes and/or devices illustrated in FIG. 2 may be combined, divided, re-arranged, omitted, eliminated and/or implemented in any other way. Further, the example people analyzer 200, the example media detector 202, the example presence detector 212, the example time stamper 206 and/or, more generally, the example base metering device 110 of FIG. 2 may be implemented by hardware, software, firmware and/or any combination of hardware, software and/ or firmware. Thus, for example, any of the example people analyzer 200, the example media detector 202, the example presence detector 212, the example time stamper 206 and/or, more generally, the example base metering device 110 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example people analyzer 200, the example media detector 202, the example presence detector 212, the example time stamper 206 and/or, more generally, the example base metering device 110 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example base metering device 110 of FIG. 2 may include one or more elements, processes and/or devices in addition to, or instead of, those illustrated in FIG. 2, and/or may include more than one of any or all of the illustrated elements, processes and devices.

FIG. 3 illustrates an example instance of the example presence table 210 of FIG. 2. In the illustrated example of FIG. 3, a first column 302 in the table 210 includes rows 304, 306, 308 corresponding to individual panelists associated with, for example, the house 100 of FIG. 1 (e.g., the first and second persons 120, 122). The first column 302 of the example presence table 210 includes one or more additional rows 310 corresponding to guests or visitors detected in the media exposure environment 102. In the illustrated example of FIG. 3, the presence table 210 includes a second column 312 to store the presence status of each of the panelists and/or guest(s) based on whether they registered (e.g., logged in) via the primary people meter 112. In the illustrated example of FIG. 3, a logical high or '1' in the second column 312 indicates the corresponding panelist is present in the media exposure environment 102 and, thus, counted as an audience member. A logical low or '0' in the second column 312 indicates the corresponding panelist is absent from the media exposure environment 102.

In the illustrated example of FIG. 3, the presence table 210 includes a tally or count 314 that stores a total number of people present in the media exposure environment 102. For example, as illustrated in FIG. 3, the first and second persons 120, 122 (corresponding to the first two rows 304, 306 of the example table 210) are indicated as present by the primary people meter 112 while a third person (e.g., a panelist tracked in the third row 308) is indicated as being absent. Further, in the illustrated example, no guests (the fourth row 310) are present. Accordingly, the total count 314 of people based on the primary presence information gathered by the primary people meter 112 is two (2). In some examples, the presence table 210 contains additional rows corresponding to other panelists and/or additional guest slots. As described in detail below, the information tracked in the presence table 210 is confirmed and/or adjusted according to the secondary presence information provided by one or more of the portable devices 114, 118.

Figure 4:
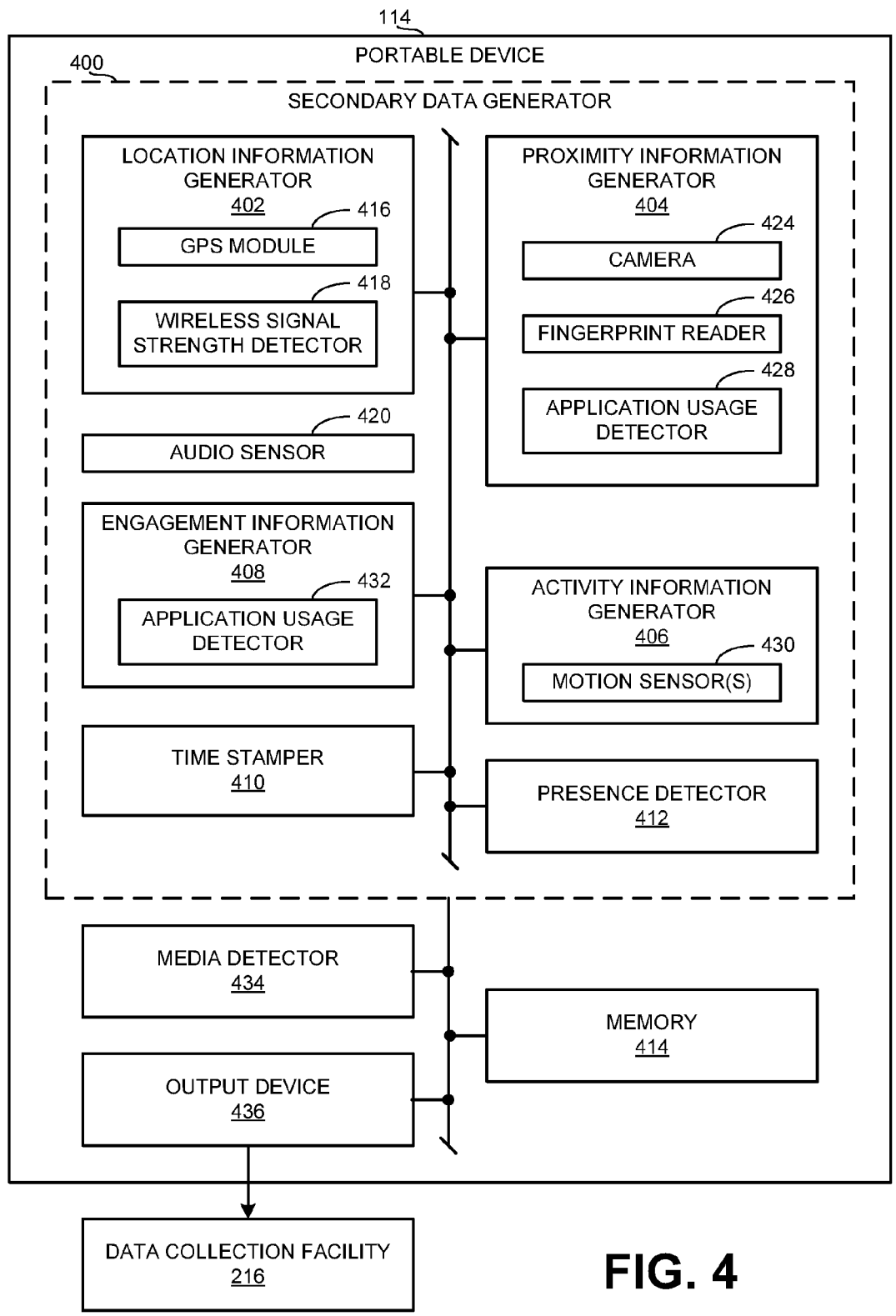
FIG. 4 is a block diagram of an example implementation of the example portable device of FIG. 1.

FIG. 4 illustrates an example implementation of the first portable device 114 of FIG. 1. The second portable device 118 of FIG. 1 may additionally or alternatively be implemented by the example of FIG. 4. In the illustrated example of FIG. 4, the portable device 114 includes a media detector 434 to collect information identifying media in a similar manner as the media detector 202 of FIG. 2 described above. In some examples, the media detector 434 collects information regarding media being viewed on the portable device 114 regardless of the source of the media (e.g., irrespective of whether the media is being played on, for example, the primary media presentation device 104 or on the portable device 114 itself (e.g., when the portable device 114 functions as a primary media presentation device)). In some examples, the media detector 434 of FIG. 4 additionally or alternatively collects information regarding supplemental media being viewed on the first portable device 114 (e.g., when the first portable device 114 functions as a second screen device). Data collected by the example media detector 434 of FIG. 4 is stored in memory 414 of the first portable device 114.

The example portable device 114 of FIG. 4 includes a secondary data generator 400 to generate data regarding, for example, the presence or absence of people in the example media exposure environment 102 of FIG. 1 (e.g., secondary presence data) and/or information about the behavior, activity, and/or engagement of a person present in the media exposure environment 102 (e.g., augmented audience data). In the illustrated example, the secondary data generator 400 includes an example location information generator 402, an example proximity information generator 404, an example activity information generator 406, an example engagement information generator 408, an example time stamper 410, and an example presence detector 412.

In some examples, an audience measurement entity provides the secondary data generator 400 to the portable device 114 by, for example, making the secondary data generator 400 available for download over a network and/or installing the secondary data generator 400 on the portable device 114. In some examples, the secondary data generator 400 is software installed on the portable device 114 that runs in the background to passively collect and generate the secondary data using one or more automated techniques as described below The example location information generator 402 of FIG. 4 generates location information using data from one or more sensors and/or detectors of the example portable device 114. For example, the location information generator 402 utilizes course location data obtained from a global positioning system (GPS) module 416. In some examples, the location information generator 402 of FIG. 4 includes a wireless signal strength detector 418 to provide location information. For example, the wireless signal strength detector 418 of FIG. 4 detects a value or strength of a wireless signal (e.g., WiFi and/or Bluetooth) received by the example portable device 114 from one or more other wireless devices in the household 100 of FIG. 1. For example, the wireless signal strength detector measures data associated with a wireless communication between the portable device 114 and the primary media presentation device 104 and/or a wireless communication between the portable device 114 and the example base metering device 110. In some examples, the wireless signal strength detector 418 generates location information based on a positional relationship of the portable device 114 relative to other wireless devices (e.g., a personal computer, a wireless router, the primary media presentation device 104, the base metering device 110, etc.). In some examples, panelists such as the first and second persons 120, 122 provide a listing of all wireless (Wi-Fi, Bluetooth) devices associated with a wireless network in the house 100 that may be stored and/or accessed by the wireless signal strength detector 418. In this manner, the example location information generator 402 utilizes the wireless signal strength detector 418 to identify a specific location of the portable device 114 within the house 100 (e.g., whether the portable device is in the same room as the primary media presentation device 104). Additionally or alternatively, the example location information generator 402 of FIG. 4 uses data collected from an audio sensor 420 (e.g., a microphone) of the portable device 114 to determine a location of the portable device 114. For example, the audio sensor 420 may capture audio signals generated by the primary media presentation device 104, which are recognized as generated by the primary media presentation device 104 based on, for example, audio codes (e.g., watermarks) in the audio signal. In some examples, the example location information generator 402 infers that the portable device 114 is in the media exposure environment 102 based on the clarity and/or strength (e.g., loudness) of the audio signal. The example location information generator 402 of FIG. 4 outputs location information corresponding to the location of the portable device 114 to the time stamper 410 and/or stored in the memory 414.

The example proximity information generator 404 of FIG. 4 generates proximity information using data from one or more sensors and/or detectors of the portable device 114 indicative of the proximity of a person (e.g., the first and/or second persons 120, 122 and/or a visitor to the house 100) to the portable device 114. For example, the proximity information generator 404 of FIG. 4 generates proximity data based on data captured via the audio sensor 420. For example, the proximity information generator 404 of FIG. 4 uses the audio sensor 420 to capture sounds produced by people (e.g., talking), thereby detecting when at least one person is near (e.g., within a threshold distance of) the portable device 114. In some examples, the proximity information generator 404 of FIG. 4 generates proximity data based on images and/or video captured by a camera 424 of the portable device 114. In some examples, the proximity information generator 404 of FIG. 4 generates proximity data based on a fingerprint reader 426. In some examples, the proximity information generator 404 generates proximity information based on usage of the portable device 114 (e.g., usage of applications running on the portable device 114) detected via an application usage detector 428. In some examples, the mere fact that the portable device 114 is being used is indicative that a person is in proximity to the portable device 114 because the person is using the device.

The example proximity information generator 404 of FIG. 4 outputs data (e.g., proximity information) to the example time stamper 410 to be time stamped in a manner similar to the location information generated by the example location information generator 402. In the illustrated example, the location information from the example location information generator 402 of FIG. 4 and the proximity information from the example proximity information generator 404 of FIG. 4 comprises the secondary presence data that is transmitted to the example base metering device 110 of FIGS. 1 and/or 2 for analysis via, for example, the presence detector 212 of the base metering device 110 as described above in connection with FIG. 2.

The example activity information generator 406 of FIG. 4 generates activity or behavior information based on, for example, data collected from one or more motion sensors 430 (e.g., accelerometer, magnetometer, etc.) of the portable device 114. In some examples, activity and/or motion sensing information is analyzed by the activity information generator 406 to determine how the portable device 114 is being handled to infer an activity or behavior of the person using the portable device 114. In some examples, the activity information generator 406 of FIG. 4 provides the activity information to the time stamper 410 to be time stamped and stored in the memory 414.

The example engagement information generator 408 of FIG. 4 determines a level of engagement of a person (e.g., the first person 120) with media being played on, for example, the primary media presentation device 104. For example, the engagement information generator 408 of FIG. 4 generates data based on usage of the portable device 144 (e.g., usage of applications running on the portable device 114) via an application usage detector 432. In some examples, the application usage detector 432 of FIG. 4 is the same as the application usage detector 428 of the proximity information generator 404. However, while the example application usage detector 428 of the proximity information generator 404 tracks whether applications are being used, the example application usage detector 432 of the engagement information generator 408 monitors how applications are being used and what media and/or subject matter is associated with the applications. For example, if a web browser is being used on the portable device 114, the example application usage detector 428 of the proximity information generator 404 records the usage to indicate that a person was using the portable device 114 and, therefore, was in proximity with the portable device 114. In contrast, the example application usage detector 432 of the engagement information generator 408 of the illustrated example records the media associated with a website being visited via the web browser. If the websites is associated with media currently being presented on the primary media presentation device 104 when a person is present in the media exposure environment 102, then a relatively high level of engagement with the media playing on the primary media presentation device 104 is inferred by the example engagement information generator 408. If, on the other hand, the visited website is unrelated to the media playing on the primary media presentation device 104, a relatively low level of engagement with the media playing on the primary media presentation device 104 is inferred by the example engagement information generator 408. In some examples, the application usage detector 432 of FIG. 4 operates in connection with the example media detector 434 of FIG. 4 to compare primary media playing on a primary media presentation device 104 (e.g., a television) with supplemental media accessed via the portable device 114. In some examples, rather than determining a level or degree of engagement of a person with the primary media, the comparison results are used to determine whether the person is to be counted as present in the media exposure environment 102 for purposes of rating the media playing on the primary media presentation device 104. For example, if the supplemental media is related to the primary media, the person may be identified as present. However, if the supplemental media is unrelated to the primary media, the person may be omitted from a list of present people.

As another example, the example application usage detector 432 of the engagement information generator 408 tracks social media application usage. For example, the application usage detector 432 of the engagement information generator 408 collects comments, tweets, posts, etc., made to, for example, one or more social networking sites and/or applications. In such examples, the content and/or subject matter of the comments, tweets, posts, etc., is analyzed and compared to the media and/or subject matter of a media presentation being played on the primary media presentation device 104 at a corresponding time. As such, in some examples, the engagement information generator 408 of FIG. 4 provides the collected engagement information to the time stamper 410 to be time stamped and stored in the memory 414. The activity information collected by the example activity information generator 406 and/or the engagement information collected by the example engagement information generator 408 form augmented audience data that is transmitted to the example base metering device 110 for analysis via, for example, the presence detector 212 as described above in FIG. 2.

In some examples, the secondary data generator 400 of FIG. 4 includes a presence detector 412. In some examples, the presence detector 412 of FIG. 4 operates in a similar manner as the presence detector 212 of FIG. 2. That is, in some examples, the presence detector 412 of FIG. 4 analyzes the presence information (e.g., the location information generated by the location information generator 402 and/or the proximity information generated by the proximity information generator 404) obtained from the portable device 114 to determine presence information for a person in the media exposure environment 102 of FIG. 1. Further, in some examples, the presence detector 412 of FIG. 4 compares the analyzed presence information to the primary presence data obtained by the primary people meter 112 (e.g., as represented in the presence table 210) received from the example base metering device 110 to either confirm the presence of persons logged in via the primary people meter 112 or to account for discrepancies between the primary presence information and the secondary presence information. Accordingly, in such examples, the example base metering device 110 transmits the primary presence data to the secondary data generator 400 of the portable device 114 in addition to or in lieu of the portable device 114 transmitting the secondary presence data to the example base metering device 110.

Additionally, as described for the presence detector 212 of FIG. 2, in some examples, the presence detector 412 of FIG. 4 analyzes the data from one or more sensors (e.g., the audio sensor 420 and/or the camera 424) to identify or estimate the identity of a person that is detected as being near the portable device 114. Additionally or alternatively, the presence detector 412 of FIG. 4 identifies or estimates a demographic characteristic of the detected person. Further, in some examples, the presence detector 412 of FIG. 4 analyzes the engagement information to determine a level of engagement of a detected person with media presented on the primary media presentation device 104. Further, in some examples, the presence detector 412 of FIG. 4 analyzes the activity information to determine the activity or behavior of the detected person during a media presentation playing on the primary media presentation device 104. The example presence detector 412 of FIG. 4 is described in greater detail below in connection with FIG. 5.

The example memory 414 of FIG. 4 may be a native memory provided on the portable device 114. The example memory 414 may include a volatile memory (e.g., Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). The example memory 414 of FIG. 4 may also include one or more mass storage devices such as, for example, hard drive disk(s), compact disk drive(s), digital versatile disk drive(s), etc.

In the illustrated example of FIG. 4, an output device 436 periodically and/or aperiodically exports data from the memory 414 to the data collection facility 216 via a network (e.g., a local-area network, a wide-area network, a metropolitan-area network, the Internet, a digital subscriber line (DSL) network, a cable network, a power line network, a wireless communication network, a wireless mobile phone network, a Wi-Fi network, etc.). In some examples, the network through which the base metering device 110 communicates with the data collection facility 216 is the same as the network used by the portable device 114.

While an example manner of implementing the first portable device 114 of FIG. 1 and/or the second portable device 118 of FIG. 1 is illustrated in FIG. 4, one or more of the elements, processes and/or devices illustrated in FIG. 4 may be combined, divided, re-arranged, omitted, eliminated and/or implemented in any other way. Further, the example secondary data generator 400, the example location information generator 402, the example GPS module 416, the example wireless signal strength detector 418, the example proximity information generator 404, the example application usage detector 428, the example engagement information generator 408, the example application usage detector 432, the example activity information generator 406, the example time stamper 410, the example presence detector 412, the example media detector 434 and/or, more generally, the example portable device 114 of FIG. 4 may be implemented by hardware, software, firmware and/or any combination of hardware, software and/or firmware. Thus, for example, any of the example secondary data generator 400, the example location information generator 402, the example GPS module 416, the example wireless signal strength detector 418, the example proximity information generator 404, the example application usage detector 428, the example engagement information generator 408, the example application usage detector 432, the example activity information generator 406, the example time stamper 410, the example presence detector 412, the example media detector 434 and/or, more generally, the example portable device 114 of FIG. 4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example secondary data generator 400, the example location information generator 402, the example GPS module 416, the example wireless signal strength detector 418, the example proximity information generator 404, the example application usage detector 428, the example engagement information generator 408, the example application usage detector 432, the example activity information generator 406, the example time stamper 410, the example presence detector 412, the example media detector 434 and/or, more generally, the example portable device 114 of FIG. 4 is/are hereby expressly defined to include a tangible computer readable storage device or storage disk such as a memory, a digital versatile disk (DVD), a compact disk (CD), a Blu-ray disk, etc. storing the software and/or firmware. Further still, the example portable device 114 of FIG. 4 may include one or more elements, processes and/or devices in addition to, or instead of, those illustrated in FIG. 4, and/or may include more than one of any or all of the illustrated elements, processes and devices.

Figure 5:
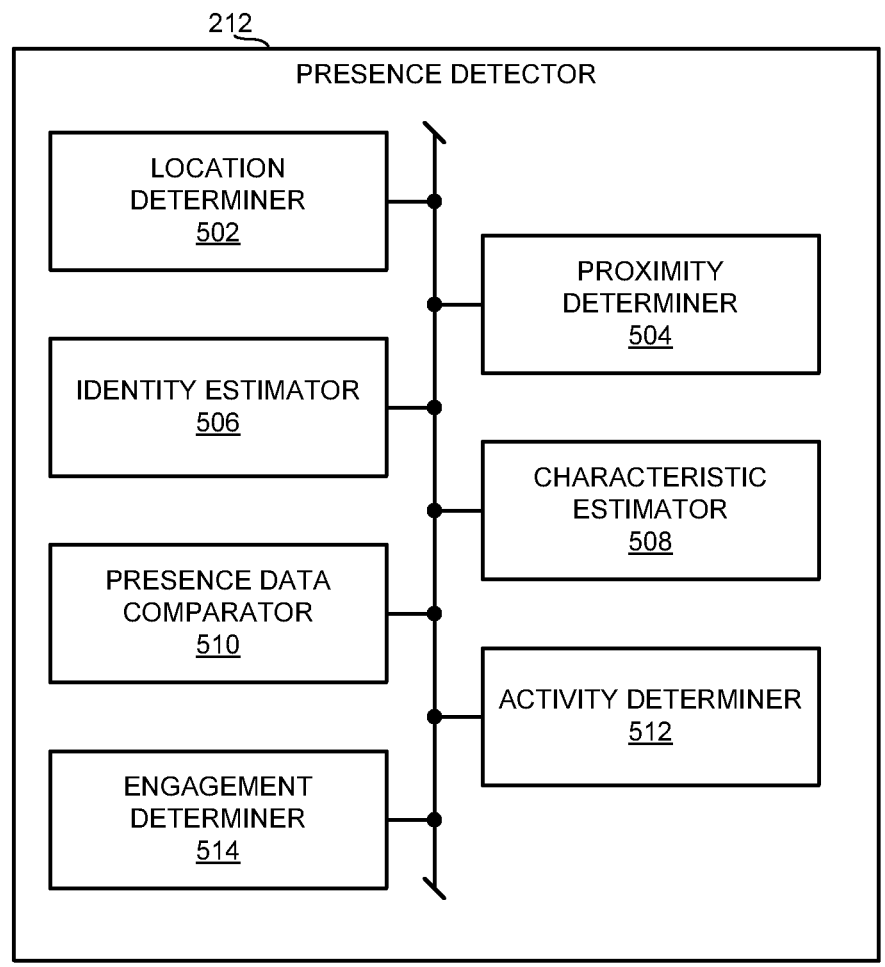
FIG. 5 is a block diagram of an example implementation of the example presence detector of FIGS. 2 and/or 4.

FIG. 5 illustrates an example implementation of the example presence detector 212 of the example base metering device 110 of FIG. 2. The example of FIG. 5 may additionally or alternatively be used to implement the presence detector 412 of the portable device 114 of FIG. 4. Additionally or alternatively, the example presence detector 212 of FIG. 5 may be implemented at the example data collection facility 216 of FIGS. 2 and/or 4. In such examples, the base metering device 110 communicates the primary presence data to the data collection facility 216 and the portable device 114 communicates the secondary presence data to the data collection facility 216.

The example presence detector 212 of FIG. 5 includes a location determiner 502, a proximity determiner 504, an identity estimator 506, a characteristic estimator 508, a presence data comparator 510, an activity determiner 512, and an engagement determiner 514. The example location determiner 502 of FIG. 5 determines a location of the portable device 114 based on data provided by the example location information generator 402 of the portable device 114 of FIG. 4. In some examples, the location determiner 502 of FIG. 5 determines the location of the portable device 114 relative to the media exposure environment 102. That is, the example location determiner 502 of FIG. 5 determines whether the portable device 114 is in an area of exposure of the primary media presentation device 104 (e.g., the media exposure environment 102) or outside the area of exposure using data collected by the portable device 114. In some examples, course location information, such as coordinates obtained via the GPS module 416 of the location information generator 402, is sufficient to make this determination. For example, if GPS location data indicates that the portable device 114 is two miles away from the house 100, the example location determiner 502 of FIG. 5 determines that the portable device 114 is not located in the media exposure environment 102. However, if GPS location data indicates the portable device is at the house 100, supplemental location information of a finer granularity is used by the example location determiner 502 to specifically locate the portable device 114 in the room including the primary media presentation device 104. Accordingly, in some examples, GPS location data is supplemented with, for example, wireless signal strength information detected by the example wireless signal strength detector 418 and/or audio signals captured by the example audio sensor 420 to determine whether the portable device 114 is located in the same room as the primary media presentation device 104 (e.g., in the media exposure environment 102) or located somewhere else in the house 100.

The example proximity determiner 504 of FIG. 5 determines whether a person is in proximity to the portable device 114 based on, for example, an analysis of audio data captured by the audio sensor 420 of the portable device 114. For example, if the audio sensor 420 detects a voice of a person near the portable device 114, the example proximity determiner 504 of FIG. 5 determines that a person is near the portable device 114. In some examples, the proximity determiner 504 determines that a person is near the portable device 114 based on image data (e.g., a picture or video, a reflected glow, etc.) captured via the camera 424 of the portable device 114. In some examples, the proximity determiner 504 of FIG. 5 determines proximity based on feedback from the fingerprint reader 426 of the portable device 114. Additionally or alternatively, in some examples, the proximity determiner 504 of FIG. 5 determines proximity based on usage information collected by the application usage detector 428 of the portable device 114.

The determination of whether a person is near the portable device 114 in conjunction with the determination of the location of the portable device 114 relative to the media exposure environment 102 enable the example presence detector 212 of FIG. 5 to determine a presence of, for example, the first person 120 in the media exposure environment 102. For example, if the example proximity determiner 504 of FIG. 5 determines that a person is in proximity to the portable device 114 and the example location determiner 502 of FIG. 5 determines that the portable device 114 is co-located with the primary media presentation device 104 (e.g., is in the media exposure environment 102), then the first person 120 is determined to be present or located in the media exposure environment 102.

In some such examples, where the primary presence data, according to the primary people meter 112, indicates that at least one person is already counted as present in the media exposure environment 102, there is a possibility that the portable device 114 is detecting the person that is already accounted for via the primary people meter 112. As such, counting the person detected as present via the portable device 114 may be duplicative. Accordingly, in some examples, the presence detector 212 of FIG. 5 includes the identity estimator 506 to estimate the identity of the detected person in proximity to the portable device 114 to confirm whether the detected person corresponds to the person logged in via the primary people meter 112. In some examples, where there is only one person that resides in the house 100, the example identity estimator 506 of FIG. 5 identifies that person as the single household member. In some examples, when there is more than one household member (e.g., as illustrated by the first and second persons 120, 122 in FIG. 1), the example identity estimator 506 of FIG. 5 determines or estimates the identity of the detected person based on, for example, an identity of the primary user associated with the portable device 114. For example, if the portable device 114 is a smart phone primarily used by the person that is currently logged in via the primary people meter 112, the example identity estimator 506 of FIG. 5 determines that the detected person is the same as the logged in person. If, on the other hand, the portable device 114 is a smart phone primarily used by a spouse of the person logged in as the audience member via the primary people meter 112, the example identity estimator 506 of FIG. 5 estimates that the person detected in proximity to the portable device 114 is the spouse and, therefore, is present in the media exposure environment 102 but has not logged in via the primary people meter 112. Example methods of determining a number of people in an area (such as the media exposure environment 102) are disclosed in U.S. application Ser. No. 13/829,067 filed on Mar. 14, 2013, which is hereby incorporated by reference in its entirety.

In some examples, the portable device 114 may not be associated with a primary user to confidently identify the detected person on that basis. For example, the first and second persons 120, 122 of FIG. 1 may share a device (e.g., a tablet or laptop computer) such that there is no apparent primary user of the portable device 114. In such examples, the identity estimator 506 of FIG. 5 assigns a probability or confidence level to each of the persons 120, 122 that they correspond to the detected person based on, for example, one or more of the secondary presence data obtained from the portable device 114. For instance, in some examples, the example identity estimator 506 of FIG. 5 analyzes the proximity information obtained from the proximity information generator 404 of the portable device 114 to assist in identifying a person detected in proximity to the portable device 114 to increase or decrease the confidence that the detected person is one of the first or second persons 120, 122. For example, the identity estimator 506 of FIG. 5 uses voice recognition technology to analyze audio data obtained via the audio sensor 420 to specifically identify the voice of the detected person as corresponding to a particular one of the persons 120, 122. In some examples, the captured audio data is compared against prerecorded voice signatures for each of the persons 120, 122 to identify the particular person 120, 122. In some examples, the captured audio data is analyzed to recognize demographic characteristics (e.g., a male voice versus a female voice) to be compared with the demographic characteristics of the persons 120, 122 previously collected as part of, for example, a registration process with the media measurement entity. Similarly, in some examples, the example identity estimator 506 of FIG. 5 analyzes the image data (e.g., a picture and/or a video) from the camera 424 of the example proximity information generator 404 of FIG. 4 using facial recognition technology to compare against previously captured images of the persons 120, 122 and/or to estimate demographics characteristics of the detected person corresponding to the characteristics of the persons 120, 122. In some examples, where the fingerprint reader 426 is used, the identity estimator 506 of FIG. 5 positively identifies the detected person based on the uniqueness of the person's fingerprint.

Additionally, in some examples, the particular applications and/or types of applications being used on the portable device 114 and/or the activity engaged in while using the applications may be used to estimate the identity of the detected person. For example, if the detected person is using applications involving children's games and/or entertainment for children, the example identity estimator 506 of FIG. 5 estimates (e.g., increases the corresponding probability) that the detected person is a child and/or reduces the probability that the detected person is an adult. Further, if there is only one child that resides in the house 100, the example identity estimator 506 of FIG. 5 significantly increases the confidence level that the person detected is the child if a children's game or other activity is detected as in use on the device. In some examples, where the application usage is late at night, the example identity estimator 506 of FIG. 5 reduces the probability that the detected person is a child and increases the probability that the detected person is an adult. Further, some applications of the portable device 114 require a user authentication (e.g., a user account login) before operating. Accordingly, in some examples, the example identity estimator 506 of FIG. 5 identifies the person detected in proximity to the portable device 114 as corresponding to a user associated with a user account of the application being used on the portable device 114 (e.g., as detected by the application usage detector 428 of the secondary data generator 400). In some examples, due to privacy and/or security concerns, the actual user login information is unavailable to the example application usage detector 428. However, in some such examples, the activity engaged in through the use of the applications is monitored and linked back to the user account. For example, the person using the portable device 114 may be participating in social media (e.g., Facebook®, Twitter®, Google+®, blogs, etc.) and may, for example, post a tweet (e.g., on Twitter®). Such an activity requires the person to be logged into the Twitter® account from which the tweet was posted. Accordingly, based on the data collected by the example application usage detector 428 of FIG. 4, the tweet can be sourced to the portable device 114 and, thus, the person using the portable device 114 can be identified as corresponding to the user account from which the tweet was posted.

In the illustrated example of FIG. 5, the identity estimator 506 generates a probability or confidence level that any particular one of the persons 120, 122 associated with the house 100 corresponds to the person detected as near the portable device 114. In some such examples, where the probability of one of the persons 120, 122 satisfies (e.g., exceeds) a certain threshold and/or is larger than the probabilities of the other persons 120, 122, the example identity estimator 506 of FIG. 5 identifies that one particular person 120, 122 as the person detected as near the portable device 114. In some examples, if the probability of correspondence between the detected person and each of the persons 120, 122 is sufficiently low (e.g., below a threshold), the example identity estimator 506 identifies the detected person as likely corresponding to a visitor (e.g., not a resident of or a panelist residing at the house 100). That is, the example identity estimator 506 of FIG. 5 identifies the detected person as a visitor to the house 100 (e.g., when the portable device 114 is located at the house 100), or identifies the person as someone of no consequence to the media exposure environment 102 (e.g., when the portable device 114 is determined to be located away from the house 100). In some examples, the secondary presence data collected by the portable device 114 indicates that more than one person is in proximity to the portable device 114. In such examples, the identity estimator 506 of FIG. 5 analyzes each such person in a similar manner as described above.

In some examples, where the example identity estimator 506 of FIG. 5 identifies the person detected as proximate to the portable device 114 as a visitor in the house 100, there is a desire to determine demographic information about the visitor. As such, the example presence detector 212 of FIG. 5 includes the characteristic estimator 508 to estimate demographic characteristics of the person in proximity to the portable device 114. The example characteristic estimator 508 of FIG. 5 operates similarly to the example identity estimator 506 of FIG. 5. The example characteristic estimator 508 of FIG. 5 analyzes the proximity information generated by the proximity information generator 404 of the portable device 114 to estimate a demographic characteristic (e.g., child/adult, male/female, etc.) of the person identified as not one of the persons 120, 122 associated with (e.g., a panelist of) the house 100. In this manner, valuable information about visitors in panelist homes can be obtained that would otherwise be unavailable because, although a traditional people meter may include a button to identify the presence of visitors, there is no input for any other information about the visitor.

The example presence detector 212 of FIG. 5 includes the presence data comparator 510 to compare the primary presence data obtained via the primary people meter 112 to the secondary presence data (e.g., location of the portable device 114 and proximity of an identified person to the portable device 114) obtained via the portable device 114. In this manner, the example presence data comparator 510 of FIG. 5 confirms the presence of people logged into the primary people meter 112 and/or updates, corrects, or adjusts the information gathered by the primary people meter 112. Because the presence information obtained from the portable device 114 is based on two variables (location of the portable device 114 and proximity of a person to the portable device 114) compared against the presence of people as determined based on login status on the primary people meter 112, there are eight different scenarios detected by the example presence data comparator 510 of FIG. 5.

Figure 6:
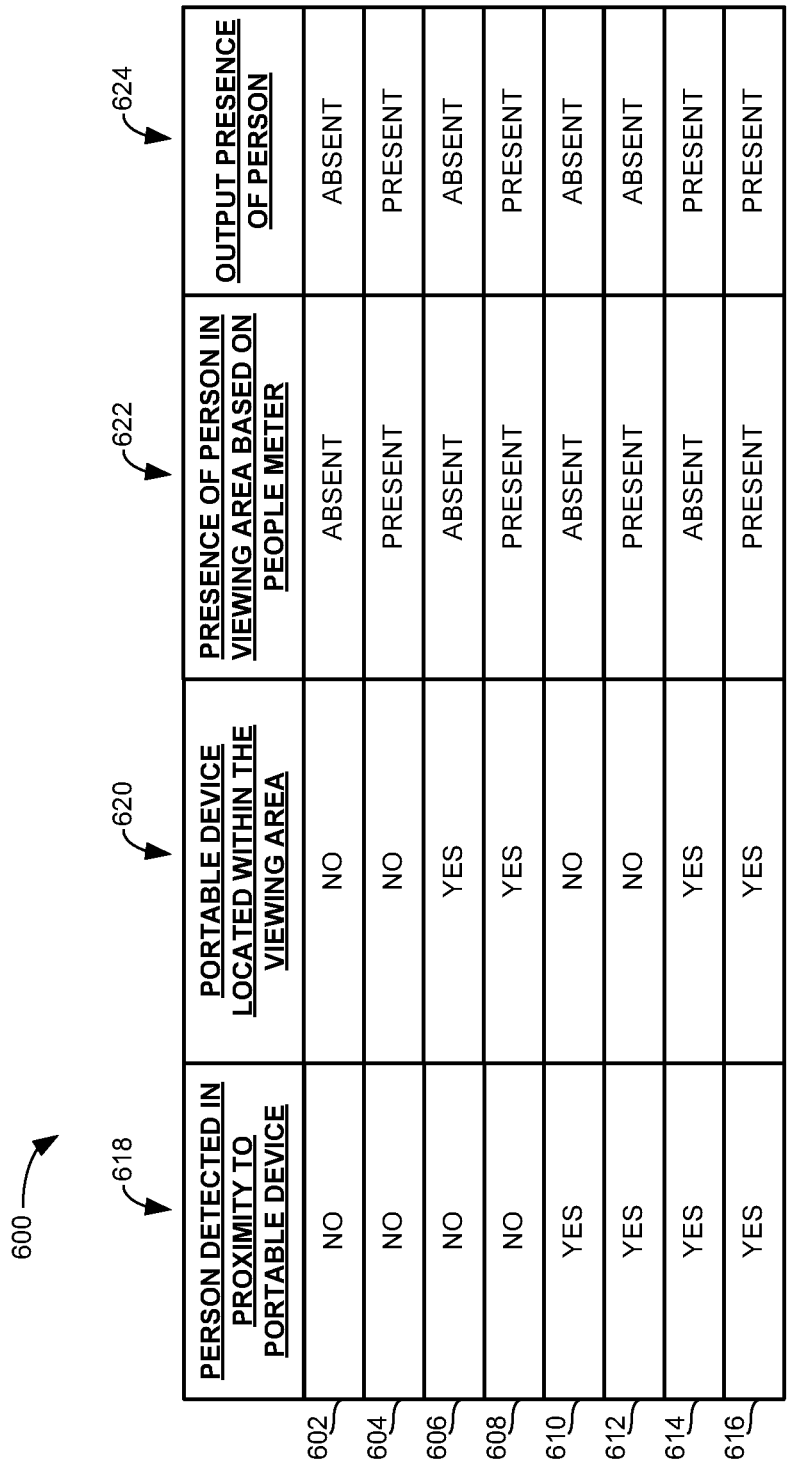
FIG. 6 is an example table including example presence data associated with the example presence detector of FIG. 5.

FIG. 6 is a table 600 that illustrates several possible scenarios 602-616 and the corresponding determinations made by the example presence data comparator 510 of FIG. 5. A first column 618 of the table 600 indicates whether a person is detected as being near the portable device 114 as determined based on proximity information collected by the portable device 114. A second column 620 of the table 600 indicates whether the portable device 114 is located in the media exposure environment 102 as determined based on location information collected by the portable device 114. A third column 622 of the table 600 indicates the presence of the person within the media exposure environment based on data collected by the primary people meter 112 (e.g., whether the person is logged in as present). A fourth column 624 of the table indicates the result of the determination made by the example presence data comparator 510 of FIG. 5 and used by the example presence detector 212 for a conclusion regarding, for example, whether the first person 120 is present in the media exposure environment 102.

As shown in the illustrated example of FIG. 6, the first four scenarios 602, 604, 606, 608 correspond to when a person is not detected in proximity to the portable device 114. In some such examples, the location of the person cannot be verified based on the secondary presence data because the location of the person cannot be linked to the location of the portable device 114. Accordingly, in some such examples, the example presence data comparator 510 of FIG. 5 ignores the presence information obtained from the portable device 114 such that the output presence of the person (fourth column 624) corresponds to the presence as determined by the primary people meter 112 (third column 622). However, in alternative scenarios, the example presence data comparator 510 of FIG. 5 infers the absence of the person from the media exposure environment 102. For example, if the portable device 114 is located away from the house 100, the example presence data comparator 510 of FIG. 5 infers that, even if the portable device 114 does not detect a person near the portable device 114, a person is likely not in the media exposure environment 102 because the portable device 114 is outside the house 100 and this is indicative of the corresponding person being outside of the house 100. Because there are other potential explanations, such as, the portable device 114 was left or lost at its detected location or is being carried by someone other than the corresponding person 120, in some such examples, the presence data comparator 510 of FIG. 5 merely flags the primary presence data recorded by the primary people meter 112 as suspect when the people meter 112 indicates the person 120 is present (e.g., the second scenario 604). Alternatively, in some examples, if the portable device 114 is located in the media exposure environment 102 while no person is detected, the example presence data comparator 510 of FIG. 5 flags the primary presence data of the primary people meter 112 as suspect that indicates that a person is present (e.g., the fourth scenario 608).

In the four scenarios 610, 612, 614, 616 represented in the bottom rows of the table 600 of FIG. 6, a person is detected by the portable device 114 as being in proximity to the portable device 114. As such, the presence of the person can be determined based on a determination of the location of the portable device 114. For example, in such scenarios, if the portable device 114 is located in the example media exposure environment 102, the presence of the person in the media exposure environment 102 may be inferred. By contrast, if the portable device 114 is not located in the media exposure environment 102, the absence of the person from the media exposure environment 102 may be inferred. Accordingly, in the fifth and eighth scenarios 610, 616 of the table 600 of FIG. 6, the example presence data comparator 510 of FIG. 5 confirms the presence or absence of the person as indicated by the primary people meter 112 because the portable device 114 is determined to be located in a location corresponding to the presence or absence of the person. In the sixth scenario 612 of the table 600 of FIG. 6, the portable device 114 is located outside of the media exposure environment 102 such that the person (determined to be in proximity to the portable device 114) is also outside the media exposure environment 102, but the primary people meter 112 indicates that the person is present. In such an example, the example presence data comparator 510 of FIG. 5 adjusts the corresponding data to indicate the person is absent rather than present. In the seventh scenario 614 of the table 600 of FIG. 6, the location of the portable device 114 (and, thus, the location of the person due to the detected proximity of the person) is determined to be within the media exposure environment 102, while the primary people meter 112 indicates the person is absent. In such an example, the example presence data comparator 510 of FIG. 5 adjusts the corresponding to indicate the person is present rather than absent.

In some examples, the scenarios of FIG. 6 described above, and the resulting output of the example presence data comparator 510 of FIG. 5 is based on a known identity (e.g., up to a certain confidence level) of the detected person. Where the identity of the person cannot be positively ascertained with sufficient certainty, in some examples, rather than adjusting the presence of registered audience members, the example presence data comparator 510 of FIG. 5 flags the primary presence data of the primary people meter 112 as suspect, indeterminate, and/or unconfirmed. In some examples, the presence data comparator 510 of FIG. 5 makes certain determinations based on the information that is available even when detected person(s) are not identified. For example, if the number of people detected by the portable device 114 exceeds the number of people logged in via the primary people meter 112, then the example presence data comparator 510 of FIG. 5 increases the total count of audience members without attributing the presence to any particular individual (e.g., panelist).

The example presence detector 212 of FIG. 5 includes the activity determiner 512 to determine an activity or behavior of the person detected via the portable device 114 based on, for example, movement data obtained via one or more sensors 430 of the activity information generator 406 of the portable device 114. For example, data from an accelerometer and/or a magnetometer of the portable device 114 is analyzed by the activity determiner 512 to determine whether the person is walking or sitting, playing a videogame, reading an e-book, browsing the internet, etc. In some examples, the activity determiner 512 of FIG. 5 associates the activity information of the person with other data (e.g., presence data, demographics data, media identifying information, etc.) to enhance or augment the data for further research analysis.

In the illustrated example of FIG. 5, the engagement determiner 514 determines a level of engagement of the person with, for example, a media presentation of the primary media presentation device 104 and/or a media presentation of the portable device 114. In some examples, the engagement determiner 514 of FIG. 5 determines the level of engagement of the person with the media presentation based on the usage of one or more programs or applications executing on the portable device 114, as collected by, for example, the application usage detector 432 of the engagement information generator 408 of FIG. 4. In some examples, the engagement determiner 514 of FIG. 5 compares the subject matter of the usage of the portable device 114 to the subject matter or media of the media presentation of the primary media presentation device 104. If the subject matter of the application usage is related to the media (e.g., a post on Facebook® about the media presentation, a visit to a website associated with the media presentation, an interaction with a second screen application, etc.), the engagement determiner 514 of FIG. 5 determines a high level of engagement with the media. If, on the other hand, the subject matter of the usage is unrelated to the media, the example engagement determiner 514 of FIG. 5 determines a low level of engagement with the media.

In some examples, the engagement determiner 514 of FIG. 5 determines the level of engagement of the person with the media based on the activity of the person determined via the activity determiner 512 and/or an additional analysis of the activity information generated by the activity information generator 406. For example, if the activity information indicates that the person is walking or moving within the media exposure environment 102, the example engagement determiner 514 of FIG. 5 determines a low level of engagement because the person is likely distracted (e.g., is paying attention to something other than the media presented on the primary media presentation device 104). If the activity information indicates that the person is relatively still (e.g., sitting), the example engagement determiner 514 of FIG. 5 determines a high level of engagement. If the activity information does not indicate any movement for an extended period of time (e.g., greater than a threshold), the example engagement determiner 514 of FIG. 5 determines that the person has likely fallen asleep and, thus, is no longer engaged in the media or has exited the room but left the portable device 114 in the media exposure environment 102. Additional or alternative techniques and/or interpretations of the activity data can be used to determine a level of engagement of a person with a media presentation. Example engagement level determination techniques are disclosed in U.S. patent application Ser. No. 13/691,579 filed on Nov. 30, 2012 and in U.S. patent application Ser. No. 13/691,557 filed on Nov. 30, 2012, both of which are hereby incorporated by reference in their entireties.

While an example manner of implementing the presence detector 212 of FIGS. 2 and/or 4 is illustrated in FIG. 5, one or more of the elements, processes and/or devices illustrated in FIG. 5 may be combined, divided, re-arranged, omitted, eliminated and/or implemented in any other way. Further, the example location determiner 502, the example proximity determiner 504, the example identity estimator 506, the example characteristic estimator 508, the example presence data comparator 510, the example activity determiner 514, the example engagement determiner 514, and/or, more generally, the example presence detector 212 of FIG. 5 may be implemented by hardware, software, firmware and/or any combination of hardware, software and/or firmware. Thus, for example, any of the example location determiner 502, the example proximity determiner 504, the example identity estimator 506, the example characteristic estimator 508, the example presence data comparator 510, the example activity determiner 514, the example engagement determiner 514, and/or, more generally, the example presence detector 212 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example location determiner 502, the example proximity determiner 504, the example identity estimator 506, the example characteristic estimator 508, the example presence data comparator 510, the example activity determiner 514, and/or the example engagement determiner 514 is/are hereby expressly defined to include a tangible computer readable storage device or storage disk such as a memory, a digital versatile disk (DVD), a compact disk (CD), a Blu-ray disk, etc. storing the software and/or firmware. Further still, the example presence detector 212 of FIG. 5 may include one or more elements, processes and/or devices in addition to, or instead of, those illustrated in FIG. 5, and/or may include more than one of any or all of the illustrated elements, processes and devices.

Figure 7:
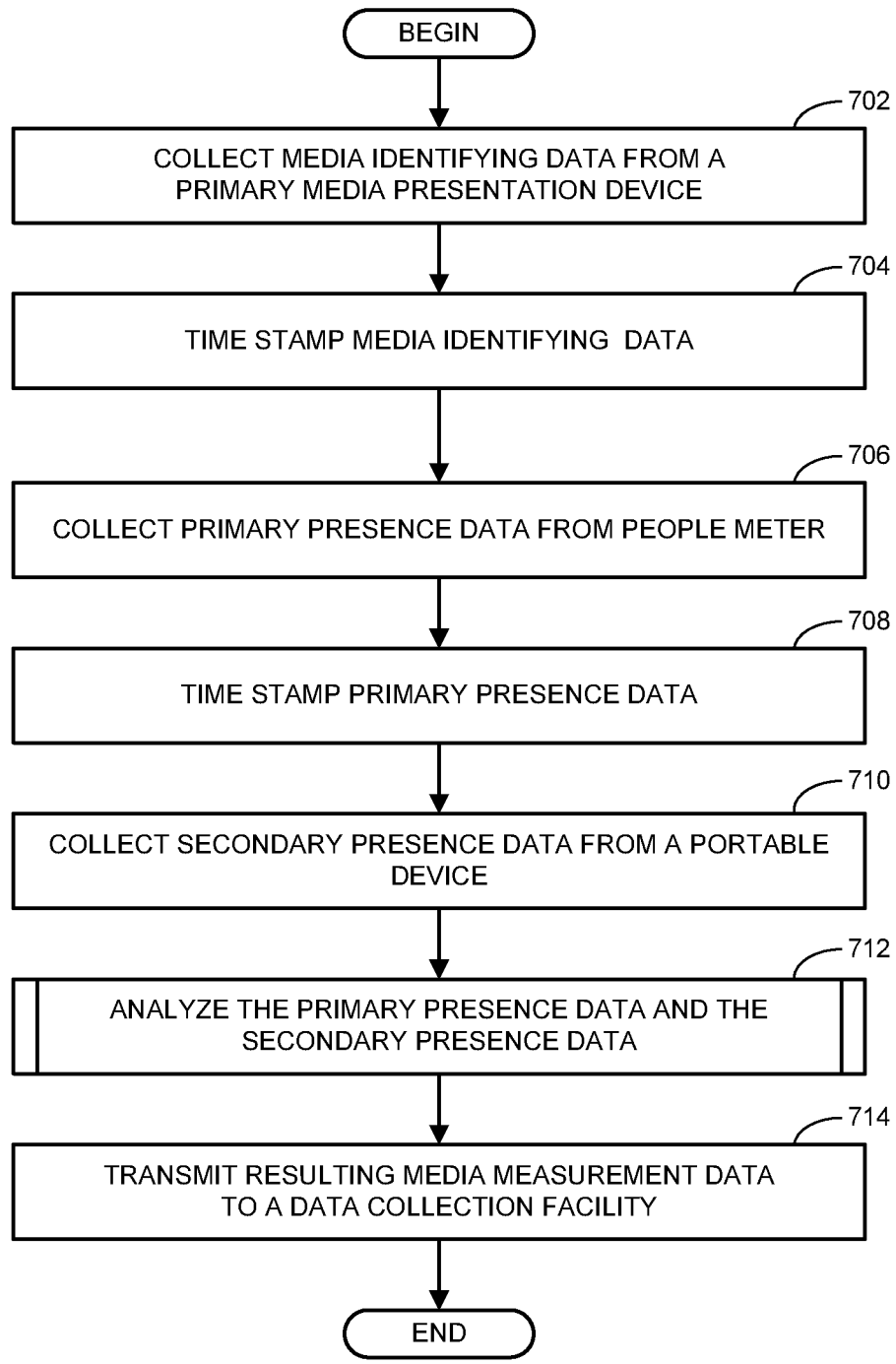
FIG. 7 is a flowchart representative of example machine readable instructions that may be executed to implement the example base metering device of FIGS. 1 and/or 2.
Figure 8:
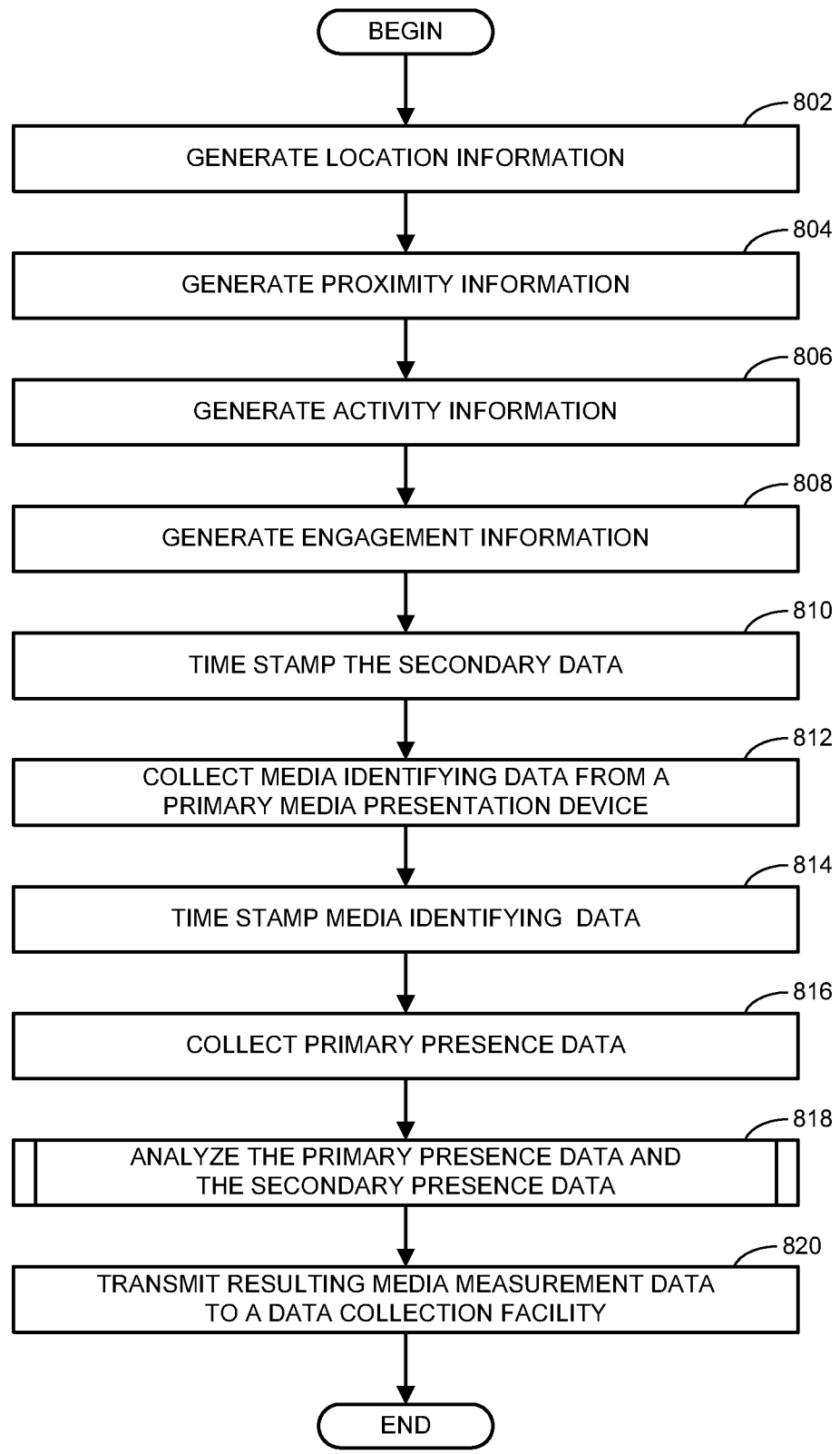
FIG. 8 is a flowchart representative of example machine readable instructions that may be executed to implement the example portable device of FIGS. 1 and/or 4.
Figure 9:
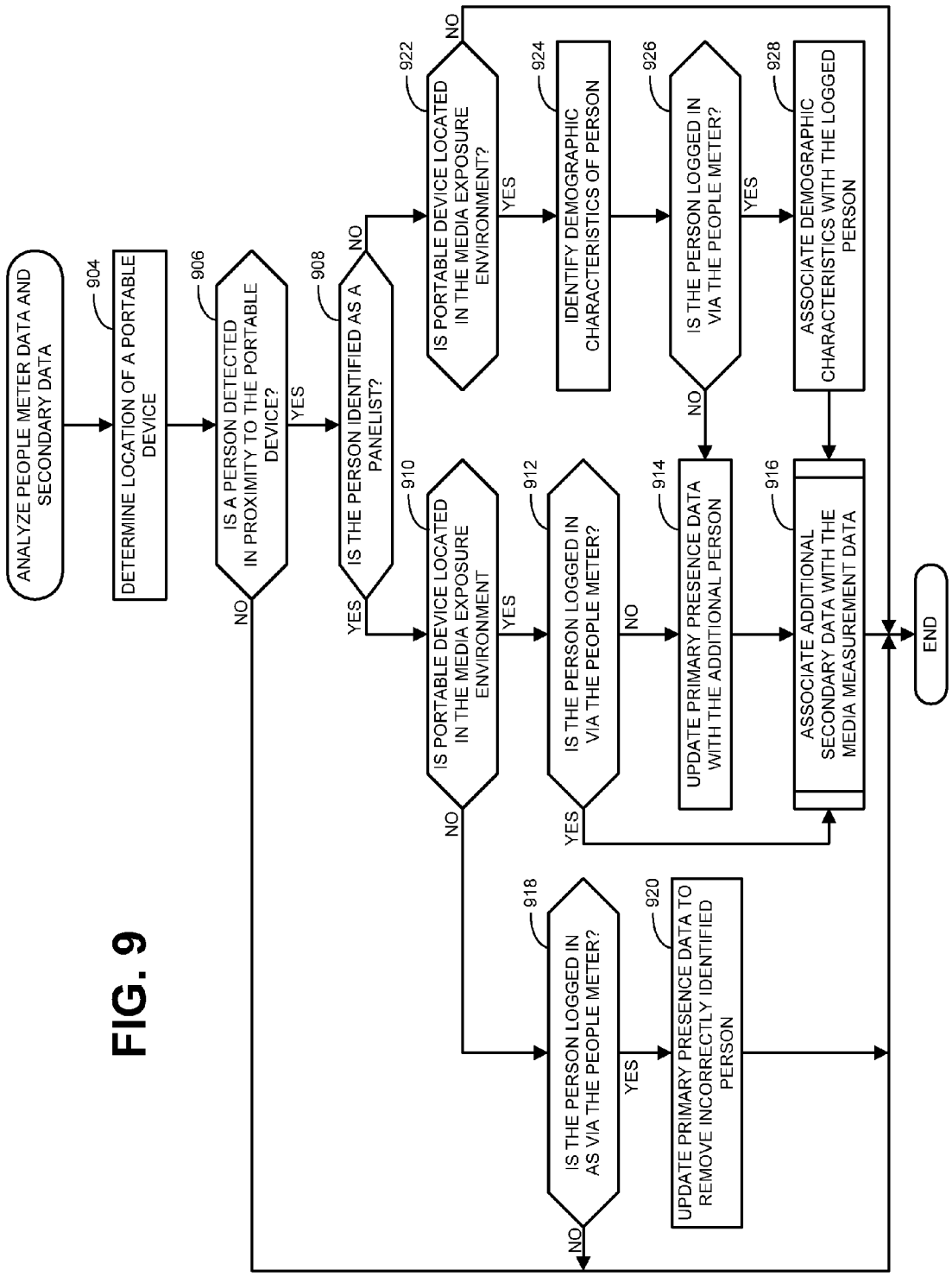
FIG. 9 is a flowchart representative of example machine readable instructions that may be executed to implement the example presence detector of FIG. 5.
Figure 10:
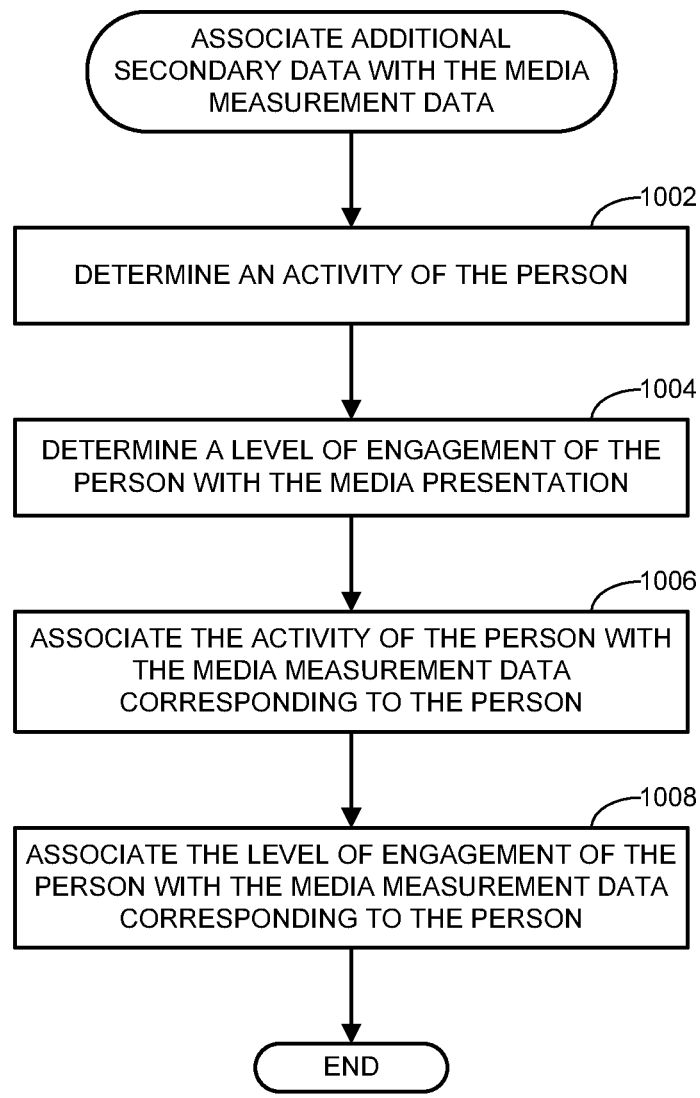
FIG. 10 is a flowchart representative of example machine readable instructions that may be executed to implement the example presence detector of FIG. 5.

A flowchart representative of example machine readable instructions for implementing the example base metering device 110 of FIGS. 1 and/or 2 is shown in FIG. 7. A flowchart representative of example machine readable instructions for implementing the example portable device 114 of FIGS. 1 and/or 4 is shown in FIG. 8. A flowchart representative of example machine readable instructions for implementing the example presence detector 212 of FIGS. 2, 4 and/or 5 is shown in FIGS. 9 and 10. In these examples, the machine readable instructions comprise a program for execution by a processor such as the processor 1112 shown in the example processor platform 1100 discussed below in connection with FIG. 11. The program may be embodied in software stored on a tangible computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 7-10, many other methods of implementing the example base metering device 110, the example portable device 114, and/or the example presence detector 212 may alternatively be used. For example, the order of execution of the blocks may be changed, and/or some of the blocks described may be changed, eliminated, or combined.

As mentioned above, the example processes of FIGS. 7-10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 7-10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

The example of FIG. 7 begins at block 702 with the example media detector 202 of FIG. 2 collecting media identifying data from a primary media presentation device (e.g., the media presentation device 104 of FIG. 1) of the media exposure environment 102 of FIG. 1. At block 704, the example time stamper 206 time stamps the media identifying data. At block 706, the example people analyzer 200 obtains primary presence data from the primary people meter 112 of FIG. 1. At block 708, the example time stamper 206 time stamps the primary presence data. At block 710, the people analyzer 200 obtains secondary presence data from a portable device (e.g., the first portable device 114 and/or the second portable device 118 of FIG. 1). In some examples, the secondary presence data is collected in response to a control signal sent via a secondary data coordinator (e.g., the secondary data coordinator 213 of FIG. 2). At block 712, the example presence detector 212 of FIG. 2 analyzes compares the primary presence data and collected by the primary people meter 112 and the secondary presence data collected by the portable device(s) 114, 118. An example implementation of block 712 is described below in connection with FIGS. 9 and 10. At block 714, the example output device 214 of FIG. 2 transmits resulting media measurement data to the data collection facility 216 as described above in connection with FIG. 2.

The example of FIG. 8 begins at block 802 with the example location information generator 402 of FIG. 4 generates location information indicative of a location of, for example, the portable device 114. At block 804, the example proximity information generator 404 of FIG. 4 generates proximity information indicative of one or more persons being near the portable device 114. At block 806, the example activity information generator 406 of FIG. 4 generates activity information indicative of one or more user interactions with the portable device 114. At block 808, the example engagement information generator 408 of FIG. 4 generates engagement information indicative of one or more levels of engagement with, for example, media playing on the primary media presentation device of the environment 102. At block 810, the example time stamper 410 time stamps the generated information (e.g., the location information generated at block 802, the proximity information generated at block 804, the activity information generated at block 806, and the engagement information generated at block 808). At block 812, the example media detector 434 of FIG. 4 collects media identifying data from, for example, the primary media presentation device (e.g., the primary media presentation device 104 of FIG. 1) of the media exposure environment 102. At block 814, the example time stamper 410 time stamps the media identifying data. At block 816, the example presence detector 412 of FIG. 4 collects primary presence data from the primary people meter 112 via, for example, the base metering device 110 of FIG. 1. At block 818, the presence detector 412 of FIG. 4 compares the primary presence data collected by the primary people meter 112 and the secondary presence data collected by the portable device 114. An example implementation of block 818 is described below in connection with FIGS. 9 and 10. At block 820, the example output device 436 of FIG. 4 transmits resulting media measurement data to the data collection facility 216.

FIG. 9 is an example implementation of block 712 of FIG. 7 and/or block 818 of FIG. 8. The example of FIG. 9 begins at block 904 with the example location determiner 502 of FIG. 5 determining the location of, for example, the first portable device 114 of FIG. 1. At block 906, the example proximity determiner 504 of FIG. 5 determines whether a person is detected in proximity to the portable device 114. If no person is detected in proximity to the portable device 114, the example of FIG. 9 ends. However, if a person is detected in proximity to the portable device 114, control advances to block 908 and the example identity estimator 506 of FIG. 5 determines whether the person is identified as a panelist (e.g., the first person 120 of FIG. 1 or the second person 122 of FIG. 1). If the example identity estimator 506 of FIG. 5 determines that the person is a panelist, control advances to block 910.

At block 910, the example location determiner 502 of FIG. 5 determines whether the portable device 114 is located in the media exposure environment 102 of FIG. 1. If the example proximity determiner 504 of FIG. 5 determines that the portable device 114 is located in the media exposure environment 102, control advances to block 912 where the example presence data comparator 510 of FIG. 5 determines whether the detected person is logged in via the primary people meter 112. In some examples, the presence data comparator 510 of FIG. 5 makes such a determination by comparing the identified person to the people logged in on the primary people meter 112 as indicated (e.g., according to the primary presence data tracked in the presence table 210 of FIG. 2). If the example presence data comparator 510 of FIG. 5 determines that the person is not logged in on the primary people meter 112, control advances to block 914 where the example presence data comparator 510 of FIG. 5 updates the primary presence data in accordance with the additional person indication. At block 916, the example activity determiner 512 of FIG. 5 and the example engagement determiner 514 of FIG. 5 associate secondary data (e.g., augmented audience data) with the media measurement data, as described below in connection with FIG. 10. If the example presence data comparator 510 of FIG. 5 determines that the person is logged in on the primary people meter 112 (block 912), control advances to block 916. That is, the example presence data comparator 510 of FIG. 5 does not update the primary presence data (block 914) because the person identified via the secondary presence data is already accounted for by the primary presence data. When the secondary data is associated with the media measurement data (block 916), the example of FIG. 9 ends.

At block 910, if the example location determiner 502 of FIG. 5 determines that the portable device 114 is not located in the media exposure environment 102, control advances to block 918 where the example presence data comparator 510 of FIG. 5 determines whether the person is logged in via the primary people meter 112 in a similar manner as described above with respect to block 912. If the example presence data comparator 510 of FIG. 5 determines that the person is logged in via the primary people meter 112, control advances to block 920 where the example presence data comparator 510 of FIG. 5 updates the primary presence data to remove the incorrectly identified person. That is, the presence information according to the person being logged-in (according to the primary presence data) is incorrect because the secondary presence data confirms that the person is away from (e.g., not located in) the media exposure environment 102. The example of FIG. 9 then ends. If the example presence data comparator 510 of FIG. 5 determines that the person is not logged in via the primary people meter 112 (block 918), the example of FIG. 9 ends because there is no relevant information to update because the location of the person being away from the media exposure environment 102 is in agreement with the logged status of the person according to the primary people meter 112 (i.e., not logged in).

At block 908, if the example identity estimator 506 of FIG. 5 determines that the person is not identified as a panelist (e.g., the person is a guest or visitor), control advances to block 922 where the example location determiner 502 of FIG. 5 determines whether the portable device 114 is located in the media exposure environment 102 in a similar manner as described above in connection with block 910. If the example location determiner 502 of FIG. 5 determines that the portable device 114 is located in the media exposure environment 102, control advances to block 924 where the example characteristic estimator 508 of FIG. 5 identifies or estimates at least one demographic characteristic of the person.

At block 926, the example presence data comparator 510 of FIG. 5 determines whether the person is logged in via the primary people meter 112. In some examples, when the identity estimator 506 of FIG. 5 determines that the person is not a panelist (block 908) but the detected person is present in the media exposure environment 102, the example presence data comparator 510 of FIG. 5 assumes that the person is a visitor or guest in the house 100. Accordingly, in some examples, the example presence data comparator 510 of FIG. 5 determines whether the person is logged in based on whether inputs into the primary people meter 112 indicate a visitor is viewing the primary media presentation device. If the example presence data comparator 510 of FIG. 5 determines that the person is logged in via the primary people meter 112, control advances to block 928 where the example presence data comparator 510 of FIG. 5 associates one or more demographic characteristics with the logged-in person before advancing to block 916. If the example presence data comparator 510 of FIG. 5 determines that the person is not logged via the primary people meter 112, control advances to block 914 where the presence data comparator 510 of FIG. 5 updates the primary presence data to indicate the presence of the person. In some such examples, the presence data comparator 510 of FIG. 5 updates the primary presence data and associates the one or more demographic characteristics with the added person. Returning to block 922, if the example location determiner 502 of FIG. 5 determines that the portable device 114 is not located in the media exposure environment, the example of FIG. 9 ends because no reliable conclusions are to be drawn based on a detected person that cannot be identified as a panelist (block 908) and is not located in the media exposure environment 102 (block 922).

FIG. 10 is a flow diagram representative of example machine readable instructions that may be executed to implement block 916 of the example of FIG. 9. The example of FIG. 10 begins at block 1002 with the example activity determiner 512 of FIG. 5 determining an activity of the detected person. At block 1004, the example engagement determiner 514 of FIG. 5 determines a level of engagement of the person with the media presentation. At block 1006, the example activity determiner 512 of FIG. 5 associates the determined activity with the media measurement data corresponding to the person. At block 1008, the example engagement determiner of FIG. 5 associates the level of engagement of the person with the media measurement data corresponding to the person. In this manner, in addition to the media measurement data indicative of a number of audience members and/or the corresponding demographic information, the media measurement data is augmented with additional information that may give a media measurement entity greater insight into the audience of a particular media presentation.

Figure 11:
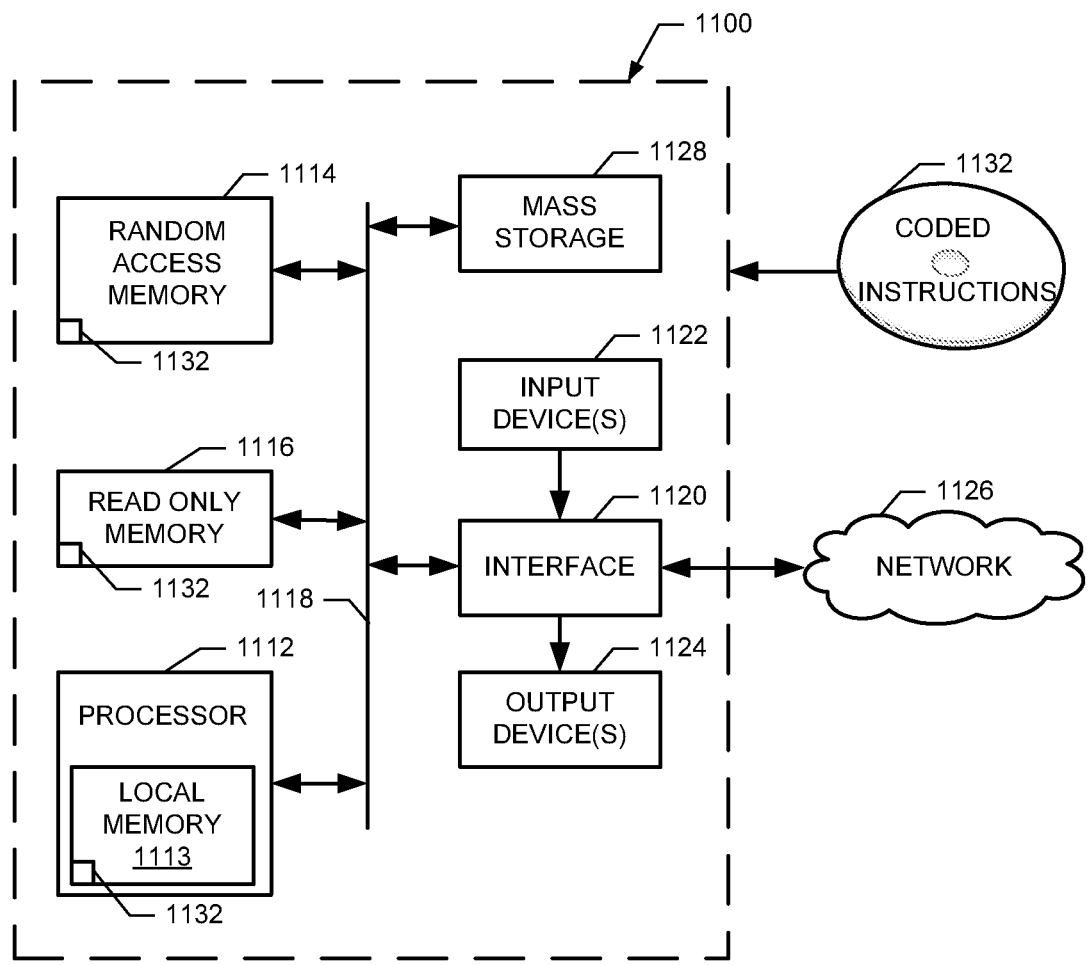
FIG. 11 is a block diagram of an example processor platform capable of executing the example machine readable instructions of FIG. 7 to implement the example base metering device of FIGS. 1 and/or 2, capable of executing the example machine readable instructions of FIG. 8 to implement the example portable device of FIGS. 1 and/or 4, capable of executing the machine readable instructions of FIG. 9 to implement the example presence detector of FIG. 5, capable of executing the machine readable instructions of FIG. 10 to implement the example presence detector of FIG. 5.

FIG. 11 is a block diagram of an example processor platform 1100 capable of executing the instructions of FIG. 7 to implement the base metering device 110 of FIGS. 1 and/or 2, capable of executing the instructions of FIG. 8 to implement the portable device(s) 114, 118 of FIGS. 1 and/or 4, and/or capable of executing the instructions of FIGS. 9 and 10 to implement the presence detector 212 of FIGS. 2, 4 and/or 5.

The processor platform 1100 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

The coded instructions 1132 of FIGS. 7-10 may be stored in the mass storage device 1128, in the volatile memory 1114, in the non-volatile memory 1116, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
    transmitting a control signal to a portable device a threshold period of time after a person logs into a people meter separate from the portable device, the control signal to cause the portable device to begin collecting location information and proximity information associated with operation of the portable device after receipt of the control signal;
    analyzing, with a processor, the location information collected by the portable device to determine a location of the portable device;
    analyzing, with the processor, the proximity information collected by the portable device to determine whether the person is near the portable device; and
    generating, with the processor, first presence information based on (1) the location information and (2) the proximity information, the first presence information indicative of whether the person is present in a media exposure environment associated with a media presentation device.

2. The method as defined in claim 1, further including comparing the first presence information to second presence information collected via the people meter.

3. The method as defined in claim 2, wherein the second presence information is generated based on manual inputs to the people meter.

4. The method as defined in claim 2, further including adjusting the second presence information based on the comparison.

5. The method as defined in claim 2, further including adjusting the second presence information by increasing a people count when the person is not logged in to the people meter and the first presence information indicates the person is present in the media exposure environment.

6. The method as defined in claim 2, further including adjusting the second presence information by decreasing a people count when the person is logged in to the people meter and the first presence information indicates the person is absent from the media exposure environment.

7. The method as defined in claim 1, further including, if the location of the portable device is within the media exposure environment, determining that the person is present in the media exposure environment when the person is near the portable device.

8. The method as defined in claim 1, wherein the proximity information is based on usage information indicative of usage of an application executing on the portable device.

9. The method as defined in claim 8, further including estimating at least one of an identity of the person or a demographic characteristic of the person based on a type of the application executing on the portable device.

10. The method as defined in claim 8, further including identifying the person based on a user account associated with the application, the usage of the application involving the person logging in to the user account.

11. The method as defined in claim 1, further including transmitting a second control signal to the portable device to request the location information and the proximity information from the portable device.

12. The method of claim 1, further including suppressing a prompt from the people meter requesting confirmation that the person is present in the media exposure environment if the first presence information indicates the person is present in the media exposure environment.

13. An apparatus comprising:
a secondary data coordinator to transmit a control signal to a portable device a threshold period of time after a person logs into a people meter separate from the portable device, the control signal to cause the portable device to begin collecting location information and proximity information;
a location determiner to determine, based on the location information collected by the portable device, a location of the portable device at a time after the portable device receives the control signal;
a proximity determiner to determine, based on the proximity information collected by the portable device, whether the person is in proximity to the portable device at the time after the portable device receives the control signal; and
a presence detector to generate first presence information based on (1) the location information and (2) the proximity information, the first presence information indicative of whether the person is present in a media exposure environment associated with a media presentation device.

14. The apparatus as defined claim 13, wherein the presence detector is further to:
compare the first presence information to second presence data collected via the people meter; and
adjust the second presence data based on the comparison.

15. The apparatus as defined in claim 13, wherein the presence detector is further to:
if the location of the portable device is within the media exposure environment, determine that the person is present in the media exposure environment when the person is in proximity to the portable device.

16. The apparatus as defined in claim 13, wherein the proximity information collected by the portable device includes usage information indicative of usage of an application executing on the portable device.

17. The apparatus as defined in claim 16, further including an identity estimator to estimate an identity of the person based on a type of the application executing on the portable device.

18. The apparatus as defined in claim 16, further including a characteristic estimator to estimate a demographic characteristic of the person based on a type of the application executing on the portable device.

19. The apparatus as defined in claim 16, further including an identity estimator to identify the person based on a user account associated with the application, the usage of the application involving the person logging in to the user account.

20. The apparatus as defined in claim 13, wherein the portable device and the media presentation device are associated with a panelist of a media measurement panel.

21. The apparatus as defined in claim 20, wherein the person is not the panelist.

22. The apparatus of claim 13, wherein the threshold period of time corresponds to a duration of time after which the people meter is to generate a prompt requesting confirmation that the person is present in the media exposure environment.

23. A tangible machine readable storage medium comprising instructions that, when executed, cause a machine to at least:
transmit a control signal to a portable device a threshold period of time after a person logs into a people meter separate from the portable device, the control signal to cause the portable device to begin collecting location information and proximity information associated with operation of the portable device after receipt of the control signal;
determine a location of the portable device based on the location information collected by the portable device;
determine whether the person is in proximity to the portable device based on the proximity information collected by the portable device; and
generate first presence information based on (1) the location of the portable device and (2) the proximity of the person to the portable device, the first presence information indicative of whether the person is present in a media exposure environment including a media presentation device.

24. The storage medium as defined in claim 23, wherein the instructions further cause the machine to compare the first presence information to second presence information collected via the people meter, the second presence information being based on manual inputs to the people meter.

25. The storage medium as defined in claim 24, wherein the instructions further cause the machine to adjust the second presence information based on the comparison.

26. The storage medium as defined in claim 25, wherein the instructions further cause the machine to adjust the second presence information by adding the person to a record of people detected in the media exposure environment when the person is not logged in via the people meter and the first presence information indicates the person is present in the media exposure environment.

27. The storage medium as defined in claim 25, wherein the instructions further cause the machine to adjust the second presence information by removing the person from a record of people detected in the media exposure environment when the person is logged in via the people meter and the first presence information indicates the person is absent from the media exposure environment.

28. The storage medium as defined in claim 23, wherein the proximity information is based on usage information indicative of usage of an application executing on the portable device.

29. The storage medium as defined in claim 28, wherein the instructions further cause the machine to identify the person based on a user account associated with the application, the usage of the application involving the person logging in to the user account.

* * * * *